(12) United States Patent
Hasegawa et al.

(10) Patent No.: US 6,508,090 B1
(45) Date of Patent: Jan. 21, 2003

(54) VEHICLE SHIFT LEVER DEVICE

(75) Inventors: Hiroyasu Hasegawa, Aichi-ken (JP); Masaki Hayashi, Aichi-ken (JP); Shozo Kito, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 13 days.

(21) Appl. No.: 09/610,892

(22) Filed: Jul. 6, 2000

(30) Foreign Application Priority Data

Jul. 13, 1999 (JP) .......................... 11-198922
May 31, 2000 (JP) ....................... 2000-163652

(51) Int. Cl.$^7$ ............................................. B60K 20/04
(52) U.S. Cl. ............................ 70/247; 70/237; 70/248; 70/292; 74/473.1; 477/99
(58) Field of Search .................... 70/247, 252, 237, 70/248; 477/99; 74/473.1

(56) References Cited

U.S. PATENT DOCUMENTS

| | | | |
|---|---|---|---|
| 1,791,807 A | | 2/1931 | Doane |
| 3,490,255 A | * | 1/1970 | Wight et al. .................. 70/239 |
| 4,955,935 A | | 9/1990 | Katayama |
| 5,050,411 A | | 9/1991 | Kawachi et al. |
| 5,299,470 A | * | 4/1994 | Snell et al. .................... 477/99 |
| 5,566,583 A | * | 10/1996 | Suzuki .......................... 477/99 |
| 5,647,818 A | * | 7/1997 | Moody ........................ 192/222 |
| 5,752,414 A | | 5/1998 | Reasoner et al. |
| 5,902,209 A | * | 5/1999 | Moody .......................... 477/99 |

FOREIGN PATENT DOCUMENTS

| | | |
|---|---|---|
| EP | 0823 575 A2 | 2/1998 |
| WO | WO 95 09748 A | 4/1995 |

* cited by examiner

*Primary Examiner*—Michael J. Zanelli
*Assistant Examiner*—Eric M Gibson
(74) *Attorney, Agent, or Firm*—Nixon Peabody LLP; Thomas W. Cole

(57) ABSTRACT

A shift lever device in which, by the integration with a key cylinder, a reduction in the use of space, simplification, cost reduction and weight lightening can be achieved. The shift lever device is such that the lever supported by a lock body that houses the key cylinder, and a first cam and second cam are provided integrally with the key cylinder. A shift lock pin and starter lock pin are provided in the lock body, and the first insertion hole, in which the shift lock pin is inserted by the first cam, and a second insertion hole and third insertion hole in which a starter lock pin is inserted by the second cam, are provided in a detent plate fixed in the shift lever. As a result, the shift lever device is integrated with the key cylinder and, for this reason, a reduction in the space for the mounting thereof, and moreover, as the connector components with the vehicle become unnecessary, a simplification, cost reduction and weight lightening, can be achieved.

1 Claim, 11 Drawing Sheets

VEHICLE SHIFT LEVER DEVICE

BACKGROUND OF THE INVENTION

1. Field of the Invention

The present invention relates to a shift lever device for shifting a speed-change gear device of a vehicle.

2. Description of the Related Art

As an anti-theft device, vehicles are generally equipped with what is known as, by way of example, a steering lock mechanism. In this steering lock mechanism, by way of example, a steering wheel is fixed to a steering column, and the steering column is housed in a steering post. In addition, a key cylinder, into which the ignition key is inserted, is housed in a lock body, the lock body is fitted to the steering post and deployed in the vicinity of the steering post, and a lock bar is provided in the lock body. In this steering lock mechanism, the rotation of the steering wheel is prevented by the engagement of the lock bar in the steering column within the steering post when the ignition key is positioned in the "LOCK" position.

Furthermore, these vehicles comprise a separate key cylinder (lock body) and shift lever device, and a key interlock mechanism and shift lock mechanism are provided in the shift lever device. In the use of this key interlock mechanism, if the shift lever is not shifted to the "P" shift position, the ignition key cannot be pulled out from the key cylinder (the ignition key cannot be rotated from the "ACC" position to the "LOCK" position). In addition, in the use of the shift lock mechanism, when the shift lever is positioned in the "P" shift position, if the ignition key is rotated to a position other than the "LOCK" position and the brake for braking the vehicle is not operated, the shift lever cannot be shifted from the "P" shift position.

In addition, the shift lever device of these vehicles comprises a starter lock mechanism. The configuration is such that, in the use of this starter lock mechanism, if the shift lever is not positioned in the "P" shift position or in the "N" shift position, no electrical current can be sent to the starter via the electrical system even when the ignition key is rotated from the "ON" position to the "START" position, and the engine cannot be started.

However, in such vehicles, because the shift lever device and key cylinder (lock body) are provided separately, space for the mounting of each of the shift lever device and key cylinder (lock body) is required and so a reduction in the space used is difficult to achieve. Furthermore, in a key interlock mechanism, shift lock mechanism and starter lock mechanism, connecting components such as cables, solenoids and electrical cord between the shift lever device and key cylinder (lock body) are necessary which leads to complexity of the mechanism, high costs and an increase in weight.

In addition, these vehicles comprise a steering lock mechanism as an anti-theft protection device so the steering post and steering column constitute a complex mechanism, the weight is increased and there is an increase in costs. Furthermore, because it is necessary for a lock bar or the like to be provided in the lock body, the scale of the lock body mechanism is enlarged, the weight is increased, and there is an increase in costs. In addition, because the lock bar of the lock body must be engaged with the steering column within the steering post (the lock body must be fitted in the steering post), the mounting position in the vehicle of the lock body is limited to the region of the steering post. Furthermore, because the rotation of the ignition key is normally executed with the right hand, the lock body must be mounted in a position in which the operation of the ignition key is executed with the right hand, and as a result, the mounting position in the vehicle of the lock body is further limited.

Furthermore, there are problems in that an electrical system is required for the starter lock mechanism so the starter lock mechanism is complex which leads to an increase in costs.

SUMMARY OF THE INVENTION

An object of the present invention, with the above-described situation in mind, is to produce a shift lever device in which reduction of the space used, simplification, reduction of costs and weight lightening can be achieved.

The shift lever device according to the invention may comprise: a shift lever which is supported rotatably in a lock body which houses a key cylinder into which an ignition key is inserted and which shifts a speed-change gear device; a first cam provided in the above-mentioned key cylinder which rotates integrally with the rotation of the above-mentioned ignition key; a lock plate fixed in the base end side of the above-mentioned shift lever which rotates in accordance with the shifting of the above-mentioned shift lever; a first insertion hole provided in the wall surface of the above-mentioned lock plate correspondent with the above-mentioned first cam which, when the above-mentioned ignition key is positioned in the "LOCK" position in a state in which the above-mentioned shift lever is positioned in the "P" shift position, opposes the above-mentioned first cam and which is held by the above-mentioned first cam; and a shift lock pin correspondent with the lock plate and above-mentioned lock body in a state in which it is urged to the above-mentioned opposing lock plate side, and which, in a state in which the above-mentioned shift lever is positioned in the "P" shift position, is able to be inserted into the above-mentioned first insertion hole by the above-mentioned first cam and, in a state in which the above-mentioned shift lever is not positioned in the "P" shift position, abuts the wall surface of the above-mentioned first cam.

The shift lever device according to the invention may comprise a key interlock mechanism, and the shift lock pin held in the lock body forms a state in which it is urged to the opposing lock plate side. In addition, the shift lock pin, in a state in which the shift lever is positioned in the "P" shift position, opposes the first insertion hole of the lock plate, and in a state in which the shift lever is not positioned in the "P" shift position, is offset from the first insertion hole to oppose the wall surface of the lock plate.

For this reason, in a state in which the shift lever is positioned in the "P" shift position, when the ignition key is rotated from the "ACC" position to the "LOCK" position, the shift lock pin is slide-shifted by the first cam to the lock plate side, and the shift lock pin is inserted into the first insertion hole of the lock plate. As a result, the slide movement of the shift lock pin to the lock plate side is not prevented by the wall surface of the lock plate and the ignition key can be rotated from the "ACC" position to the "LOCK" position.

On the other hand, when an attempt is made to move the ignition key from the "ACC" position to the "LOCK" position in a state in which the shift lever is not positioned in the "P" shift position, the slide movement, due to the first cam, of the shift lock pin to the lock plate side is prevented by the abutment of the shift lock pin against the wall surface of the lock plate. As a result, the shift lock pin meshes with the first cam to stop the rotation of the first cam, and for this reason, the rotation of the ignition key, by way of the key cylinder, from the "ACC" position to the "LOCK" position is prevented.

Accordingly, in the use of this key interlock mechanism, if the shift lever is not shifted to the "P" shift position, the ignition key cannot be pulled out from the key cylinder.

Furthermore, this shift lever device comprises a shift lock mechanism. As is described above, when the ignition key is rotated from the "ACC" position to the "LOCK" position in a state in which the shift lever is positioned in the "P" shift position, the shift lock pin is slide-shifted to the lock plate side by the first cam, and the shift lock pin is inserted in the first insertion hole of the lock plate fixed in the shift lever. As a result, the shift lock pin prevents the rotation of the lock plate, and for this reason, the shifting of the shift lever from the "P" shift position is prevented.

Meanwhile, when the ignition key is rotated to a position other than the "LOCK" position in a state in which the shift lever is positioned in the "P" shift position, in accordance with the rotation of the first cam, the shift lock pin is slide-shifted to the opposing lock plate side by the urging forces. As a result, the shift lock pin is pulled out from the first insertion hole of the lock plate.

Accordingly, in the use of the shift lock mechanism, if the ignition key is not rotated to a position other than the "LOCK" position, the shift lever cannot be shifted from the "P" shift position.

Here, in the use of the shift lever device according to the invention, the shift lever is supported by a lock body which houses the key cylinder, and a first cam is provided in the key cylinder. Furthermore, a first insertion hole correspondent with the first cam is provided in the wall surface of the lock plate fixed in the shift lever, and a shift lock pin correspondent to the lock plate and first cam is held by the lock body. As a result, the shift lever device is integral with the key cylinder (lock body), and for this reason, there is no need for the provision of space for each of the shift lever device and key cylinder (lock body), and a reduction in the space used can be achieved. Furthermore, for this reason, connection components such as cables, solenoids and electrical cord between the shift lever device and key cylinder (lock body) in the key interlock mechanism and shift lock mechanism are unnecessary, and a simplification, reduction in costs and weight-lightening can be achieved.

In addition, in the use of the key interlock mechanism and shift lock mechanism, when the ignition key is pulled out from the key cylinder for parking the vehicle, based on the key interlock mechanism, the shift lever is positioned in the "P" shift position. Accordingly, when the vehicle is parked, the shift lever is positioned in the "P" shift position, and in this state, based on the shift lock mechanism, unless the ignition key is rotated to a position other than the "LOCK" position, the shift lever cannot be shifted from the "P" shift position. That is to say, in the state in which the vehicle is parked, the shift lever cannot be shifted from the "P" shift position without an ignition key and, as a result, the key interlock mechanism and shift lock mechanism are able to function as an anti-theft device.

Accordingly, in the shift lever device according to the invention by virtue of the fact that the key cylinder (lock body) is integrated, the key interlock mechanism and shift lock mechanism are able to function as an anti-theft device, and as a result, the conventional steering lock mechanism can be dispensed with whereby a simplification, weight-lightening and reduction of costs of the steering column to which is fixed the steering wheel and the steering post which houses this steering column can be achieved. In addition, the conventional lock bar and the like of the lock body can be dispensed with, and as a result, compacting, weight-lightening and cost reduction of the lock body can be achieved. Furthermore, because there is no need for a conventional lock body lock bar to be caused to engage with the steering column, there is no need for the deployment of the lock body in the vicinity of the steering post (no need for the lock body to be fitted in the steering post), and an increase in the degree of freedom of the mounting position in the vehicle of the lock body can be achieved.

The shift lever device according to the invention may comprise: a shift lever, which is supported rotatably in a lock body which houses a key cylinder into which an ignition key is inserted and which performs the shifting in a speed-change gear device; a second cam provided in the above-mentioned key cylinder which rotates integrally with the rotation of the above-mentioned ignition key; a lock plate fixed in the base end side of the above-mentioned shift lever which rotates in accordance with the shifting of the above-mentioned shift lever; a second insertion hole-provided in the wall surface of the above-mentioned lock plate correspondent with the above-mentioned second cam which, when the above-mentioned ignition key is positioned in the "START" position in a state in which the above-mentioned shift lever is positioned in the "P" shift position, opposes the above-mentioned second cam; and a starter lock pin correspondent with the lock plate and above-mentioned second cam which is held in the above-mentioned lock body in a state in which it is urged to the above-mentioned opposing lock plate side, and, in a state in which the above-mentioned shift lever "P" is positioned in the shift position, is able to be inserted into the above-mentioned second insertion hole by the above-mentioned second cam, and, in a state in which the above-mentioned shift lever is not positioned in the "P" shift position, abuts the wall surface of the above-mentioned lock plate so as to be able to stop the rotation of the above-mentioned second cam.

The shift lever device according to the invention may further comprise a starter lock mechanism, and the starter lock pin held in the lock body forms a state in which it is urged to the opposite lock plate side. In addition, the starter lock pin, in a state in which the shift lever is positioned in the "P" shift position, opposes the second insertion hole of the lock plate. On the other hand, in a state in which the shift lever is not positioned in the "P" shift position, the starter lock pin is offset from the second insertion hole to oppose the wall surface of the lock plate.

For this reason,in a state in which the shift lever is positioned in the "P" shift position, when thr ignition key is rotated from the "ON" position to the "START" position, the starter lock pin is slide-shifted by the second cam to the lock plate side, and the starter lock pin is inserted into the second insertion hole of the lock plate. As a result, when the shift lever lever is positioned in the "P" shift position, the slide movement of the starter lock pin to the lock plate side is not prevented by the wall surface of the lock plate and the ignition key can be rotated from the "ON" position to the "START" position.

On the other hand, when an attempt is made to move the ignition key from the "ON" position to the "START" position in a state in which the shift lever is not positioned in the "P" shift position, the slide movement, due to the second cam, of the starter lock pin to the lock plate side is prevented by the abutment of the starter lock pin against the wall surface of the lock plate. As a result, the starter lock pin engages with the second cam to stop the rotation of the second cam, and for this reason, the rotation of the ignition key by way of the key cylinder from the "ON" position to the "START" position is prevented.

Accordingly, in the use of the starter lock mechanism of the shift lever device according to the invention, if the shift lever is not positioned in the "P" shift position, the ignition key cannot be rotated from the "ON" position to the "START" position, and the engine cannot be started.

Here, in the use of the shift lever device according to the invention, the shift lever is supported by a lock body which houses the key cylinder, and a second cam is provided in the key cylinder. Furthermore, a second insertion hole correspondent with the second cam is provided in the wall surface of the lock plate fixed in the shift lever, and a shift lock pin correspondent to the lock plate and the second cam is held by the lock body. As a result, the shift lever device is integral with the key cylinder (lock body), and for this reason, there is no need for the provision of space for each of the shift lever device and key cylinder (lock body), and a reduction in the space used can be achieved. Furthermore, for this reason, connection components such as electrical cord between the shift lever device and key cylinder (lock body) in the starter lock mechanism are unnecessary, and a simplification, reduction in costs and weight-lightening can be achieved.

In addition, the shift lever device according to the invention, by virtue of the fact that the key cylinder (lock body) is integrated, in the starter lock mechanism, the rotation of the ignition key from the "ON" position to the "START" position can be mechanically prevented, and for this reason, the conventional electrical system can be dispensed with and a simplification and reduction in costs of the starter lock mechanism can be achieved.

In addition, in the shift lever device according to claim 6, by virtue of the fact that the key cylinder (lock body) is intergrated, in the starter lock mechanism, the rotatioon of the ignition key from the /"ON" positikon to the "START" position" can be mechanically prevented, and for thius reason, the conventional electrical system can be dispensed with and a simplification and reduction in costs of the starter lock mechanism can be achieved.

The shift lever is further characterized in that it may comprise a third insertion hold provided in the wall surface of the above-mentioned lock plate correspondent with the above-mentioned second cam, and in that, when the above-mentioned ignition key is positioned in the "START" position in a state in which the above-mentioned shift lever is positioned in the "N" shift position, it opposes the above-mentioned second cam, wherein, in a state in which the above-mentioned shift lever is positioned in the "N" shift position, the above-mentioned starter lock pin is able to be inserted into the above-mentioned third insertion hold by the aforementioned second cam, and in a state in which the above-mentioned shift lever is not positioned in the "N" shift position, the above-mentioned starter lock pin abuts the wall surface of the above-mentioned lock plate so as to be able to stop the rotation of the above-mentioned second cam.

The shift lever device according to the invention may further comprise a starter lock mechanism, and the starter lock pin held in the lock body forms a state in which it is urged to the opposing lock plate side. In addition, the starter lock pin, in a state in which the shift lever is positioned in the "P" shift position, opposes the second insertion hole of the lock plate and, in a state in which the shift lever is positioned in the "N" shift position, opposes the third insertion hole of the lock plate. On the other hand, and in a state in which the shift lever is not positioned in the "P" shift position or the "N" shift position, the starter lock pin is offset from the second insertion hole and the third insertion hole to oppose the wall surface of the lock plate.

For this reason, in a state in which the shift lever is positioned in the "P" shift position, when the ignition key is rotated from the "ON" position to the "START" position, the starter lock pin is slide-shifted by the second cam to the lock plate side, and the starter lock pin is inserted into the second insertion hole of the lock plate. Furthermore, when the ignition key is rotated from the "ON" position to the "START" position in a state in which the shift lever is positioned in the "N" shift position, the starter lock pin is slide shifted to the lock plate side by the second cam, and the starter lock pin is inserted in the third insertion hole of the lock plate. As a result, in the state in which the shift lever is positioned in the "P" shift position or "N" shift position, the slide movement of the starter lock pin to the lock plate side is not prevented by the wall surface of the lock plate and the ignition key can be rotated from the "ON" position to the "START" position.

On the other hand, when an attempt is made to move the ignition key from the "ON" position to the "START" position in a state in which the shift lever is not positioned in the "P" shift position or the "N" shift position, the slide movement, due to second cam, of the starter lock pin to the lock plate side is prevented by the abutment of the starter lock pin against the wall surface of the lock plate. As a result, the starter lock pin engages with the second cam to stop the rotation of the second cam, and for this reason, the rotation of the ignition key by way of the key cylinder from the "ON" position to the "START" position is prevented.

Accordingly, in the use of the starter lock mechanism of the shift lever device according to the invention, if the shift lever is not positioned in the "P" shift position or the "N" shift position, the ignition key cannot be rotated from the "ON" position to the "START" position and the engine cannot be started.

Here, in the use of the shift lever device according to the invention, the shift lever is supported by a lock body which houses the key cylinder, and a second cam is provided in the key cylinder. Furthermore, a second insertion hole and third insertion hole correspondent with the second cam are provided in the wall surface of the lock plate fixed in the shift lever, and the shift lock pin correspondent to the lock plate and second cam is held by the lock body. As a result, the shift lever device is integral with the key cylinder (lock body), and for this reason, there is no need for the provision of space for each of the shift lever device and key cylinder (lock body), and a reduction in the space used can be achieved. Furthermore, for this reason, connection components such as electrical cord between the shift lever device and key cylinder (lock body) in the starter lock mechanism are unnecessary, and a simplification, reduction in costs and weight-lightening can be achieved.

In addition, in the shift lever device according to the invention, by virtue of the fact that the key cylinder (lock body) is integrated, the rotation of the ignition key from the "ON" position to the "START" position in the starter lock mechanism can be mechanically prevented, and for this reason, the conventional electrical system can be dispensed with and a simplification and reduction in costs of the starter lock mechanism can be achieved.

The shift lever device according to the invention may comprise: a shift lever which is supported rotatably in a lock body which houses a key cylinder into which an ignition key is inserted and which shifts a speed-change gear device; a first cam provided in the above-mentioned key cylinder which rotates integrally with the rotation of the above-mentioned ignition key; a second cam provided in the above-mentioned key cylinder which rotates integrally with the rotation of the above-mentioned ignition key; a lock plate fixed in the base end side of the above-mentioned shift lever which rotates in accordance with the shifting of the above-mentioned shift lever; a first insertion hole provided in the wall surface of the above-mentioned lock plate correspondent with the above-mentioned first cam which, when the above-mentioned ignition key is positioned in the "LOCK" position in a state in which the above-mentioned shift lever is positioned in the "P" shift position, opposes the above-mentioned first cam; a shift lock pin correspondent with the lock plate and above-mentioned first cam which is held by the above-mentioned lock body in a state in which it is urged to the above-mentioned opposing lock plate side, and, in a state in which the above-mentioned shift lever is positioned in the "P" shift position, is able to be inserted into the above-mentioned first insertion hole by the above-mentioned first cam and in a state in which the above-mentioned shift lever is not positioned in the "P" shift position, abuts the wall surface of the above-mentioned lock plate, so as to be able to stop the rotation of the above-mentioned first cam; provided in the wall surface of the above-mentioned lock plate opposing the above-mentioned second cam, one of either a second insertion hole which, when the above-mentioned ignition key, in a state in which the above-mentioned shift lever is positioned in the "P" shift position, is positioned in the "START" position, opposes the above-mentioned second cam, or a third insertion hole which, when the above-mentioned ignition key, in a state in which the above-mentioned shift lever is positioned in the "N" shift position, is positioned in the "START" position, opposes the above-mentioned second cam; and a starter lock pin which is held in the above-mentioned lock body in a state in which it opposes the above-mentioned second cam and lock plate and is urged to the above-mentioned opposing lock plate side, and which is able to be inserted into either of the above-mentioned second insertion hole or above-mentioned third insertion hole by the above-mentioned second cam in one of either a state in which the above-mentioned shift lever is positioned in the "P" shift position or in which it is positioned in the "N" shift position, and which abuts the wall surface of the above-mentioned lock plate, in one of either a state in which the above-mentioned shift lever is not positioned in the "P" shift position or it is not positioned in the "N" shift position, whereby it is able to stop the rotation of the above-mentioned second cam.

The shift lever device according to claim 8 comprises a key interlock mechanism, and the shift lock pin held in the lock body forms a state in which it is urged to the opposing lock plate side. In addition, the shift lock pin, in a state in which the shift lever is positioned in the "P" shift position, opposes the first insertion hole of the lock plate, and in a state in which the shift lever is not positioned in the "P" shift position, is offset from the first insertion hole to oppose the wall surface of the lock plate.

For this reason, in a state in which the shift lever is positioned in the "P" shift position, when the ignition key is rotated from the "ACC" position to the "LOCK" position, the shift lock pin is slide-shifted by the first cam to the lock plate side, and the shift lock pin is inserted into the first insertion hole of the lock plate. As a result, the slide movement of the shift lock pin to the lock plate side is not prevented by the wall surface of the lock plate and the ignition key can be rotated from the "ACC" position to the "LOCK" position.

On the other hand, when an attempt is made to move the ignition key from the "ACC" position to the "LOCK" position in a state in which the shift lever is not positioned in the "P" shift position, the slide movement, due to the first cam, of the shift lock pin to the lock plate side is prevented by the abutment of the shift lock pin against the wall surface of the lock plate. As a result, the shift lock pin engages with the first cam to stop the rotation of the first cam, and for this reason, the rotation of the ignition key, by way of the key cylinder, from the "ACC" position to the "LOCK" position is prevented.

Accordingly, in the use of this key interlock mechanism, if the shift lever is not shifted to the "P" shift position, the ignition key cannot be pulled out from the key cylinder.

Furthermore, this shift lever device comprises a shift lock mechanism. As is described above, when the ignition key is rotated from the "ACC" position to the "LOCK" position in a state in which the shift lever is positioned in the "P" shift position, the shift lock pin is slide-shifted to the lock plate side by the first cam, and the shift lock pin is inserted in the first insertion hole of the lock plate fixed in the shift lever. As a result, the shift lock pin prevents the rotation of the lock plate, and for this reason, the shifting of the shift lever from the "P" shift position is prevented.

Meanwhile, when the ignition key is rotated to a position other than the "LOCK" position in a state in which the shift lever is positioned in the "P" shift position, in accordance with the rotation of the first cam, the shift lock pin is slide-shifted to the opposing lock plate side by the urging forces. As a result, the shift lock pin is pulled out from the first insertion hole of the lock plate.

Accordingly, in the use of the shift lock mechanism, if the ignition key is not rotated to a position other than the "LOCK" position, the shift lever cannot be shifted from the "P" shift position.

In addition, this shift lever device comprises a starter lock mechanism, and a starter lock pin held in the lock body forms a state in which it is urged to the opposing lock plate side. Here, in a case where a second insertion hole is provided in the lock plate, for example, the starter lock pin, in a state in which the shift lever is positioned in the "P" shift position, opposes the second insertion hole. Meanwhile, the starter pin, in a state in which the shift lever is not positioned in the "P" shift position, is offset from the second insertion hole to oppose the wall surface of the lock plate.

For this reason, when the ignition key is rotated from the "ON" position to the "START" position in a state in which the shift lever is positioned in the "P" shift position, the starter lock pin is slide-shifted by the second cam to the lock plate side, and the starter lock pin is inserted into the second insertion hole of the lock plate. As a result, when the shift lever is positioned in the "P" shift position, the slide movement of the starter lock pin to the lock plate side is not prevented by the wall surface of the lock plate and the ignition key can be rotated from the "ON" position to the "START" position.

On the other hand, when an attempt is made to rotate the ignition key from the "ON" position to the "START" position in a state in which the shift lever is not positioned in the "P" shift position, the slide movement, due to the second cam, of the starter lock pin to the lock plate side is prevented by the abutment of the starter lock pin against the wall surface of the lock plate. As a result, the starter lock pin engages with the second cam to stop the rotation of the second cam, and for this reason, the rotation of the ignition key, by way of the key cylinder, from the "ON" position to the "START" position is prevented.

Accordingly, in the use of the starter lock mechanism in the case where a second insertion hole is provided in the lock plate, when the shift lever is not positioned in the "P" shift position, the ignition key cannot be rotated from the "ON" position to the "START" position and the engine cannot be started.

Next, by way of example, in the case where a third insertion hole is provided in the lock plate, the starter lock pin, in a state in which the shift lever is positioned in the "N" shift position, opposes the second insertion hole of the lock plate. On the other hand, in a state in which the shift lever is not positioned in the "N" shift position, the starter lock pin is offset from the third hole to oppose the wall surface of the lock plate.

For this reason, in a state in which the shift lever is positioned in the "N" shift position, when the ignition key is rotated from the "ON" position to the "START" position, the starter lock pin is slide-shifted by the second cam to the lock plate side, and the starter lock pin is inserted into the third insertion hole of the lock plate. As a result, in the state in which the shift lever is positioned in the "N" shift position, the slide movement of the starter lock pin to the lock plate side is not prevented by the wall surface of the lock plate and the ignition key can be rotated from the "ON" position to the "START" position.

On the other hand, when an attempt is made to rotate the ignition key from the "ON" position to the "START" position in a state in which the shift lever is not positioned in the "N" shift position, the slide movement, due to the second cam, of the starter lock pin to the lock plate side is prevented by the abutment of the starter lock pin against the wall surface of the lock plate. As.a result, the starter lock pin engages with the second cam to stop the rotation of the second cam, and for this reason, the rotation of the ignition key by way of the key cylinder from the "ON" position to the "START" position is prevented.

Accordingly, in the use of the starter lock mechanism in the case where a third insertion hole is provided in the lock plate, unless the shift lever is positioned in the "N" shift position, the ignition key cannot be rotated from the "ON" position to the "START" position, and the engine cannot be started.

Here, in the use of the shift lever device according to the invention, the shift lever is supported by a lock body which houses the key cylinder, and a first cam and a second cam are provided in the key cylinder. In addition, a first insertion hole correspondent with the first cam is provided in the wall surface of a lock plate fixed in the shift lever, and a shift lock pin correspondent to the lock plate and the first cam is held by the lock body. Furthermore, one of either a second insertion hole or third insertion hole correspondent with the second cam is provided in the wall surface of the lock plate fixed in the shift lever, and a shift lock pin correspondent to the lock plate and the second cam is held by the lock body. As a result, the shift lever device is integral with the key cylinder (lock body), and for this reason, there is no need for the provision of space for each of the shift lever device and key cylinder (lock body), and a reduction in the space used can be achieved. Furthermore, for this reason, connection components between the shift lever device and key cylinder (lock body) in the key interlock mechanism, shift lock mechanism and starter lock mechanism such as cables, solenoids and electrical cord are unnecessary, and a simplification, reduction in costs and weight-lightening can be achieved.

In addition, in the use of the key interlock mechanism and shift lock mechanism, when the ignition key is pulled out from the key cylinder for parking the vehicle, based on the key interlock mechanism, the shift lever is positioned in the "P" shift position. Accordingly, when the vehicle is parked, the shift lever is positioned in the "P" shift position, and in this state, based on the shift lock mechanism, unless the ignition key is rotated to a position other than the "LOCK" position, the shift lever cannot be shifted from the "P" shift position. That is to say, in the state in which the vehicle is parked, the shift lever cannot be shifted from the "P" shift position without an ignition key and, as a result, the key interlock mechanism and shift lock mechanism are able to function as an anti-theft device.

Accordingly, in the shift lever device according to the invention, by virtue of the fact that the key cylinder (lock body) is integrated, the key interlock mechanism and shift lock mechanism are able to function as an anti-theft device and, as a result, the conventional steering lock mechanism can be dispensed with and a simplification, weight-lightening and reduction of costs of the steering column, to which is fixed the steering wheel, and the steering post, which houses this steering column, can be achieved. In addition, the conventional lock bar and the like of the lock body can be dispensed with and, as a result, compacting, weight-lightening and cost reduction of the lock body can be achieved. Furthermore, because there is no need for a conventional lock body lock bar to be caused to engage with the steering column (no need for the lock body to be fitted in the steering post), there is no need for the deployment of the lock body in the vicinity of the steering post, and an increase in the degree of freedom of the mounting position in the vehicle of the lock body can be achieved.

In addition, in the shift lever advice according to claim 8, by virtue of the fact that the key cylinder (lock body) is integrated, the rotation of the ignition key in the starter lock mechanism from the "ON" position to the "START" position can be mechanically prevented, and for this reason, the conventional electrical system can be dispensed with and a simplification and reduction in costs of the starter lock mechanism can be achieved.

The shift lever device according to the invention may further comprise: a lock body for rotatably supporting a shift lever that shifts a speed-change gear device; a transmitter for transmitting predetermined information; a starter member provided in the above-mentioned lock body wherein, by virtue of the fact that the above-mentioned transmitter is deployed in the vehicle, a receive provided correspondent with the above-mentioned transmitter receives the above-mentioned information, and when operated in a state in which the above-mentioned shift lever is positioned in the "P" shift position, starts the engine; a lock plate fixed in the base end side of the above-mentioned shift lever which rotates in accordance with the shifting of the above-mentioned shift lever; and a shift lock pin provided in the above-mentioned lock body correspondent with the above-mentioned lock plate and which is connected to the brake for braking the vehicle and which, in a state in which the above-mentioned engine is started, unless the above-mentioned brake is operated, engages with the above-mentioned lock plate to prevent the rotation of the above-mentioned lock plate.

In the shift lever device according to the invention, by virtue of the fact that the transmitter is deployed in the vehicle, the receiver unit receives the prescribed information that the transmitter transmits. Here, when the starter member is operated in a state in which the receiver unit receives the prescribed information from the transmitter in this way, and the shift lever is positioned in the "P" shift position, the engine is started.

In addition, this shift lever device comprises a shift lock mechanism. Unless the brake is operated in a state in which the engine has been started as described above, the shift lock pin engages with the lock plate to prevent the rotation of the lock plate. For this reason, the shifting from the "P" shift position of the shift lever is prevented.

Meanwhile, when the brake is operated in a state in which the engine is started as described above, the engagement of the shift lock pin with the lock plate is released whereby rotation of the lock plate is permitted. For this reason, the shifting from the "P" shift position of the shift lever is possible.

Accordingly, in the use of the shift lock mechanism, unless the brake is operated in a state in which the engine is started, the shift lever cannot be shifted from the "P" shift position.

Here, in the use of the shift lever device according to the invention, the shift lever is supported by a lock body, and a shift lock pin, correspondent to a lock plate fixed in the shift lever, is provided in the lock body. As a result, the shift lever device is integral with the lock body and, for this reason, there is no need for the provision of space for each of the shift lever device and the lock body, and a reduction in the space used can be achieved. Furthermore, for this reason, connection components such as cables, solenoids and electrical cord between the shift lever device and lock body in the shift lock mechanism are unnecessary, and simplification, reduction in costs and weight-lightening can be achieved.

In addition, in the shift lever device, the shift lever is normally positioned in the "P" shift position when the car is parked, and in this state, based on the shift lock mechanism, unless the brake is operated in a state in which the engine is started, the shift lever cannot be shifted from the "P" shift position. That is to say, in the state in which the car is parked, unless the engine is started the shift lever cannot be shifted from the "P" shift position and, as a result, this shift lock mechanism is able to function as an anti-theft device.

Accordingly, in the shift lever device according to the invention, by virtue of the fact that the lock body is integrated, the shift lock mechanism is able to function as an anti-theft device and, as a result, the conventional steering lock mechanism can be dispensed with whereby a simplification, weight-lightening and reduction of costs of the steering column, to which is fixed the steering wheel, and the steering post, which houses this steering column, can be achieved. In addition, the conventional lock bar and the like of the lock body can be dispensed with and as a result, compacting, weight-lightening and cost-reduction of the lock body can be achieved. Furthermore, because there is no need for a conventional lock body lock bar to be caused to engage with the steering column (no need for the lock body to the fitted to the steering post), there is no need for the deployment of the lock body in the vicinity of the steering post, and an increase in the degree of freedom of the mounting position in the vehicle of the lock body can be achieved. Furthermore, because a configuration can be formed in which it is not always necessary that the operation of the starter member be performed with the right hand (can easily be performed with the left hand), there is no need for the lock body to be mounted in a position in which the operation of the starter member is performed by the right hand and, as a result, the operability of the starter member is better maintained and an increase in the degree of freedom of the mounting position in the vehicle of the lock body can be achieved.

It will be noted that a configuration may be adopted in which the engine cannot be stopped unless the shift lever is in the "P" shift position and, as a result, when the car is parked, the shift lever is always positioned in the "P" shift position. Accordingly, the shift lock mechanism can function reliably as an anti-theft device.

The shift lever device is notable in that it may comprise: a key cylinder housed in the above-mentioned lock body; an immobilizer key, on which is recorded specific information which is able to be inserted in the above-mentioned key cylinder; and an immobilizer coil provided in the above-mentioned lock body which, by virtue of the fact that the above-mentioned immobilizer key is inserted in the above-mentioned key cylinder, is able to read the above-mentioned specific information and, wherein the above-mentioned immobilizer key is inserted in the above-mentioned key cylinder whereby the above-mentioned immobilizer coil reads the above-mentioned specific information and, when the above-mentioned immobilizer key is rotated in a state in which the above-mentioned shift lever is in the "P" position, the above-mentioned engine is started.

In the shift lever device according to the invention, by the insertion of the immobilizer key into the key cylinder, the specific information recorded on the immobilizer key is read by the immobilizer coil. Here, the specific information of the immobilizer key is read by the immobilizer coil in this way, and when the immobilizer key is rotated in a state in which the shift lever is positioned in the "P" shift position, the engine is started. As a result, by way of example, even when a battery disconnection to or breakdown of the transmitter occurs (when the prescribed information is not transmitted from the transmitter) the engine can be started.

The shift lever device may also comprise: a lock body for supporting a shift lever that performs the shifting in a speed-change gear device to have freedom to rotate; a key cylinder housed in the above-mentioned lock body; an immobilizer key able to be inserted in the above-mentioned key cylinder on which is recorded specific information; and an immobilizer coil provided in the above-mentioned lock body which, by virtue of the fact that the above-mentioned immobilizer key is inserted in the above-mentioned key cylinder, is able to read the above-mentioned specific information; and in which the above-mentioned immobilizer key is inserted in the above-mentioned key cylinder whereby the above-mentioned immobilizer coil reads the above-mentioned specific information, and the above-mentioned engine is started when the above-mentioned immobilizer key is rotated in a state in which the above-mentioned shift lever is in the "P" shift position, is characterized in that it a lock plate fixed to the base end side of the above-mentioned shift lever which rotates in accordance with the shifting of the above-mentioned shift lever, and a shift lock pin, provided in the above-mentioned lock body opposing the above-mentioned lock plate and which is connected to the brake for braking the vehicle and which, unless the above-mentioned brake is operated in a state in which the above-mentioned engine has been started, engages with the above-mentioned lock plate to prevent the rotation of the above-mentioned lock plate.

By the insertion of the immobilizer key into the key cylinder, the specific information recorded on the immobilizer key is read by the immobilizer coil. Here, the specific information of the immobilizer key is read by the immobilizer coil in this way, and when the immobilizer key is rotated in a state in which the shift lever is positioned in the "P" shift position, the engine is started.

In addition, the shift lever device comprises a shift lock mechanism. Unless the brake is operated in a state in which the engine is started as described above, the shift lock pin engages with the lock plate to prevent the rotation of the lock plate. For this reason, the shift operation of the shift lever from the "P" shift position is prevented.

Meanwhile, when the brake is operated in a state in which the engine is started as described above, the engagement of the shift lock pin with the lock plate is released whereby rotation of the lock plate is permitted. For this reason, the shifting from the "P" shift position of the shift lever is possible.

Accordingly, in the use of the shift lock mechanism, unless the brake is operated in a state in which the engine is started, the shift lever cannot be shifted from the "P" shift position.

Here, the shift lever is supported by a lock body which houses a key cylinder, and a shift lock pin, correspondent to a lock plate fixed in the shift lever, is provided in the lock body. As a result, the shift lever device is integral with the lock body (key cylinder) and for this reason, there is no need for the provision of space for each of the shift lever device and lock body (key cylinder), and a reduction in the space used can be achieved. Furthermore, for this reason, connection components such as cables solenoids and electrical cord between the shift lever device and lock body (key cylinder) in the shift lock mechanism are unnecessary, and a simplification, reduction in costs and weight-lightening can be achieved.

In addition, in this shift lever device, the shift lever is normally positioned in the "P" shift position when the vehicle is parked, and in this state, based on the shift lock mechanism, unless the brake is operated in a state in which the engine is started, the shift lever cannot be shifted from the "P" shift position. That is to say, in the state in which the car is parked, unless the engine is started the shift lever cannot be shifted from the "P" shift position and, as a result, the shift lock mechanism is able to function as an anti-theft device.

Accordingly, by virtue of the fact that the lock body (key cylinder) is integrated, the shift lock mechanism is able to function as an anti-theft device and, as a result, the conventional steering lock mechanism can be dispensed with whereby a simplification, weight-lightening and reduction of costs of the steering column, to which the steering wheel is fixed, and the steering post, which houses this steering column, can be achieved. In addition, the conventional lock bar and the like of the lock body can be dispensed with and, as a result, compacting, weight-lightening and cost reduction of the lock body can be achieved. Furthermore, because there is no need for a conventional lock body lock bar to be caused to engage with the steering column (no need for the lock body to be fitted in the steering post), there is no need for the deployment of the lock body in the vicinity of the steering post, and an increase in the degree of freedom of the mounting position in the vehicle of the lock body can be achieved.

It will be noted that a configuration may be adopted in which the engine cannot be stopped unless the shift lever is in the "P" shift position and, as a result, when the vehicle is parked, the shift lever is always positioned in the "P" shift position. Accordingly, the shift lock mechanism can function reliably as an anti-theft device.

DETAILED DESCRIPTION OF THE PREFERRED EMBODIMENTS

First Embodiment

Figure 1A:
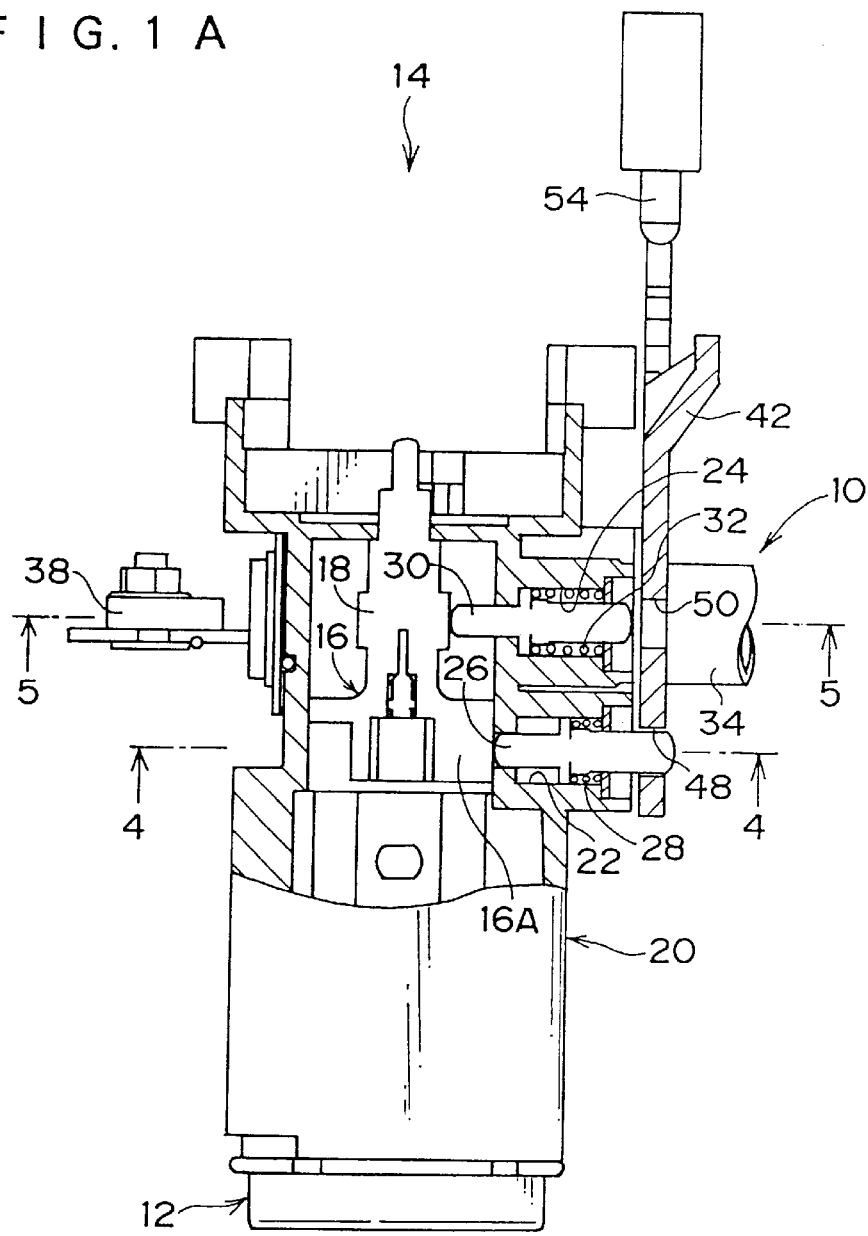
FIG. 1A is a plan view of a cross section of one part of the integrated component of the integrated shift lever device and key cylinder pertaining to a first embodiment of the present invention.
Figure 1B:
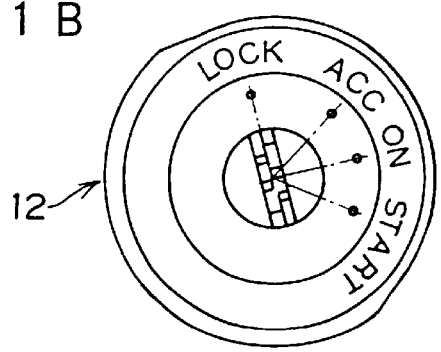
FIG. 1B is a front surface view of the key cylinder.
Figure 2:
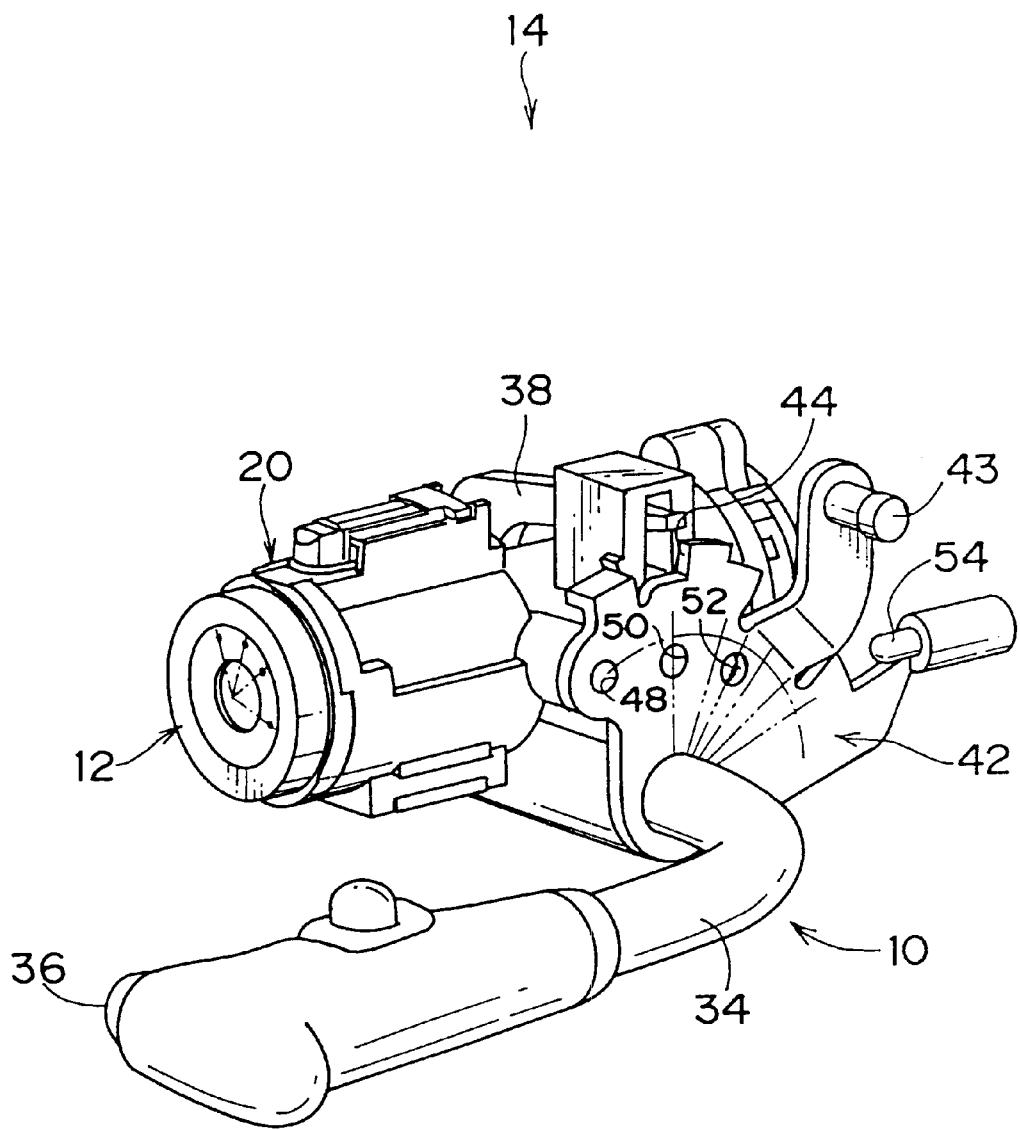
FIG. 2 is a perspective view as seen from the right diagonal front of the integrated component of the integrated shift lever device and key cylinder pertaining to the first embodiment of the present invention.
Figure 3:
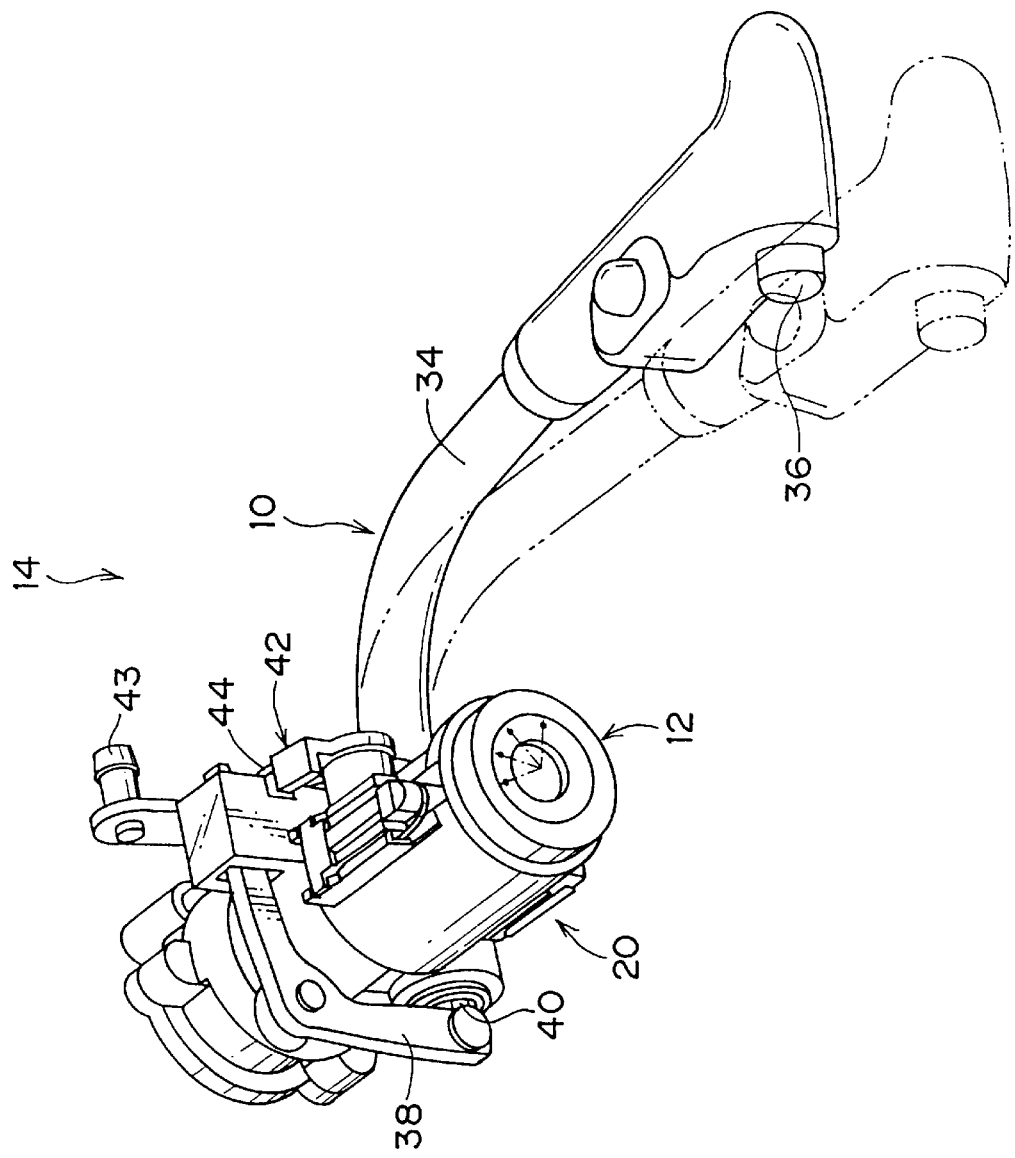
FIG. 3 is a perspective view as seen from the left diagonal front of the integrated component of the integrated shift lever device and key cylinder pertaining to the first embodiment of the present invention.

FIG. 1A shows a plan view of a cross section of one part of an integrated component 14 configured from the integration of a shift lever device 10 and key cylinder 12 pertaining to a first embodiment of the present invention, and FIG. 1B shows a front surface view of the key cylinder 12. FIG. 2 shows a perspective view, as seen from the right diagonal front, of the: integrated component 14, and FIG. 3 shows a perspective view, as seen from the left diagonal front, of the integrated component 14.

The shift lever device 10 pertaining to the embodiment, which is a so-called column-type shift lever device, constitutes an operation part and is configured from the integrated component 14 integrated with the key cylinder 12 into which an ignition key (omitted from the diagram) is inserted.

The key cylinder 12 is deployed in the driver seat instrument panel (omitted from the diagram). A first cam 16 and second cam 18 are fixed to the vehicle front side of the key cylinder 12, and the first cam 16 and second cam 18 rotate integrally with the rotation of the ignition key.

Figure 4:
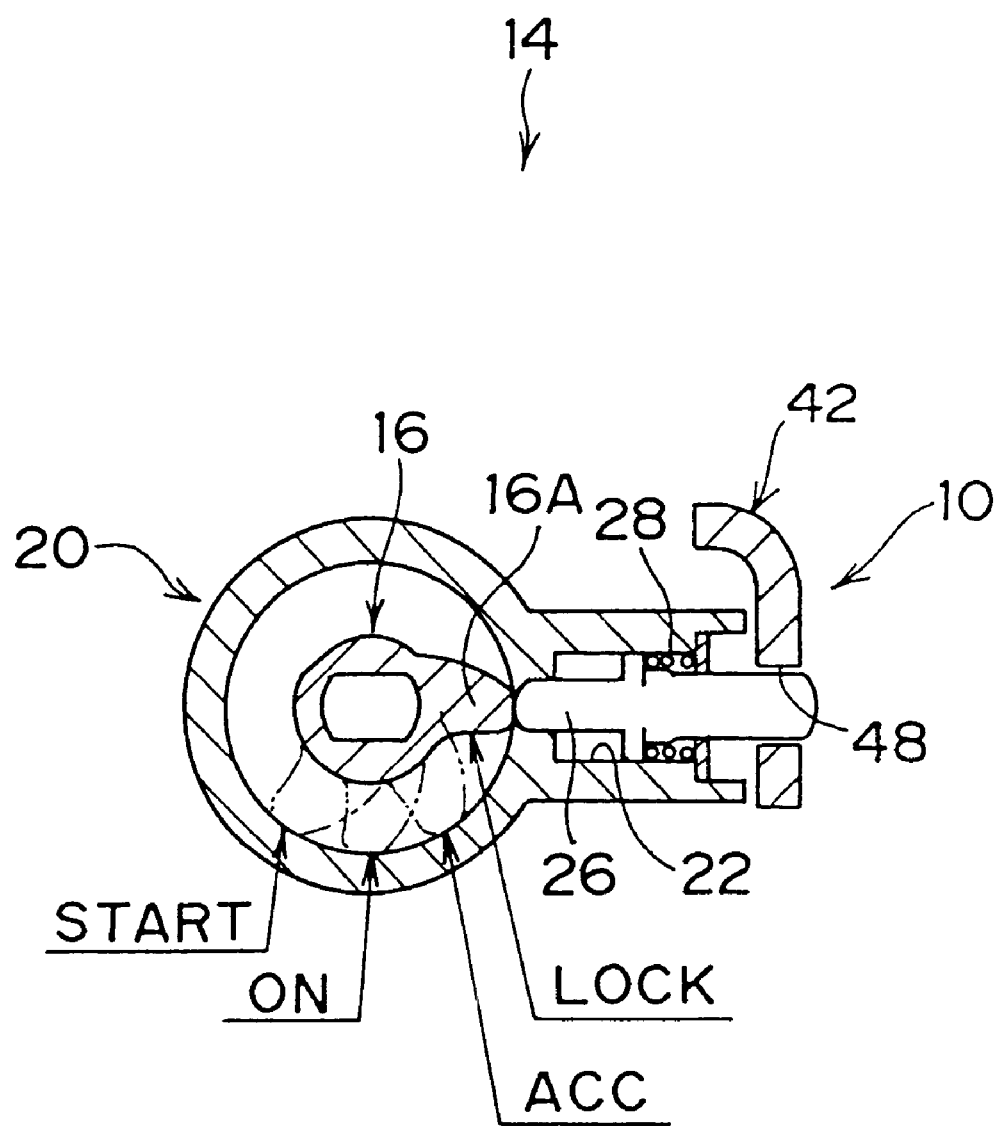
FIG. 4 is a cross-sectional view along the line 4—4 of FIG. 1A.
Figure 5:
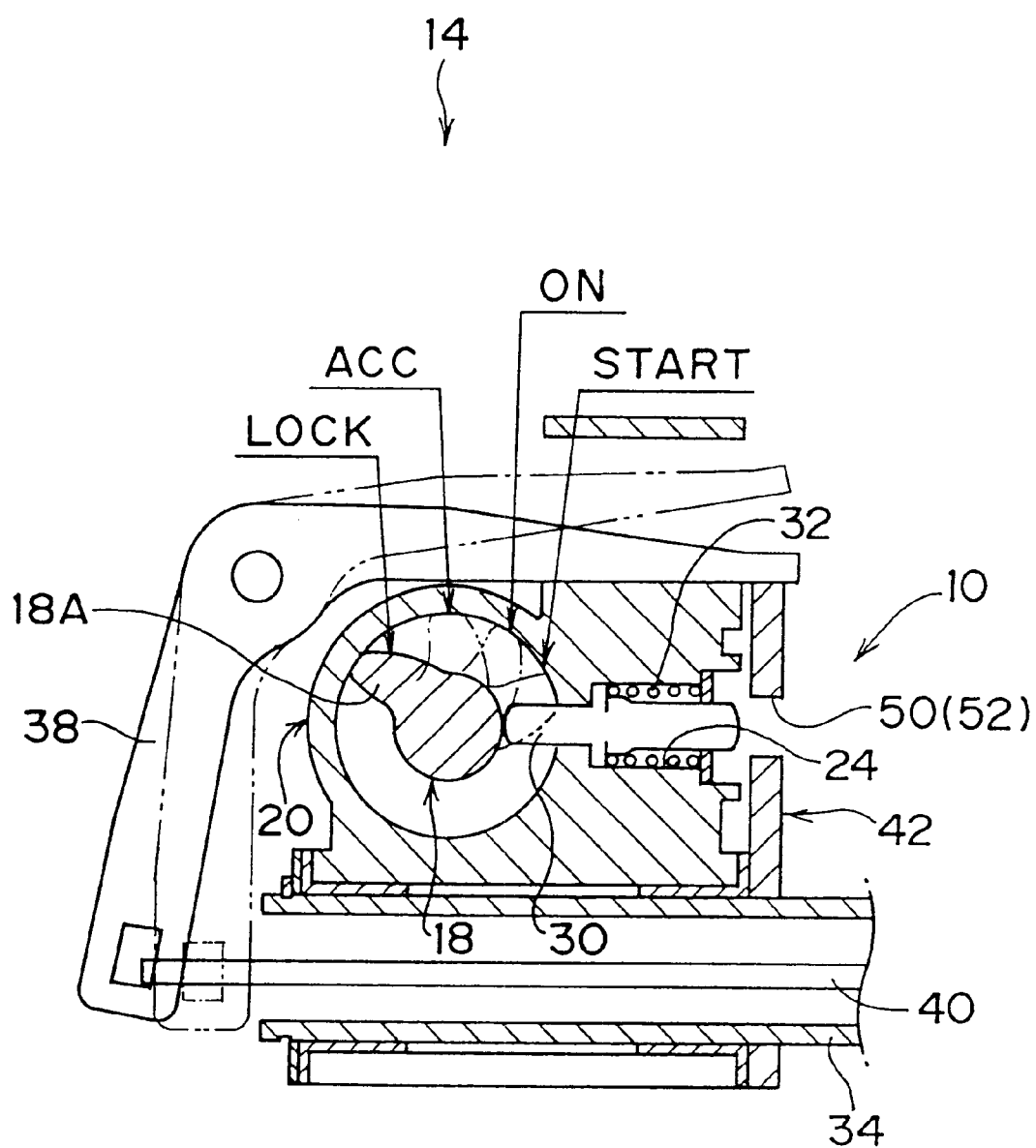
FIG. 5 is a cross-sectional view along the line 5—5 of FIG. 1A.

The key cylinder 12 (including the first cam 16 and the second cam 18), are housed in an substantially cylinder shape lock body 20 which constitutes the operation part. A first support hole 22 is formed in the side wall of the lock body 20 and, when the ignition key is positioned in the "LOCK" position, as shown in FIG. 1 and FIG. 4, it is in a position which opposes a projecting part 16A of the above-described first cam 16 in the first support hole 22. Furthermore, a second support hole 24 is formed adjacent to the first support hole 22 in the side wall of the lock body 20 and, when the ignition key is positioned in the "START" position, as shown in FIG. 5, it is in a position which opposes a projecting part 18A of the above-described second cam 18 in the second support hole 24.

A shift lock pin 26 is supported so as to be able to have slide movement in the first support hole 22, and the shift lock pin 26 is urged to the lock body 20 inner side by a pressure coil spring 28. When the ignition key is positioned in the "LOCK" position, as shown in FIG. 1 and FIG. 4, the shift lock pin 26 resists the urging forces of the pressure coil spring 28 due to the above-described projecting part 16A of the first cam 16 and slide-shifts to the lock body 20 outer side and, as a result, the shift lock pin 26 projects from the side wall of the lock body 20.

In addition, one edge part of the shift lock pin 26 (later-described detent plate 42 side edge part) is a substantially semicircular shape, and the shift lock pin 26 is formed in a substantially circular cross-section shape (substantially cylinder shape).

A starter lock pin 30 is supported so as to be able to have slide movement in the second support hole 24, and the starter lock pin 30 is urged to the lock body 20 inner side by a pressure coil spring 32. When the ignition key is positioned in the "START" position, as shown in FIG. 5, the starter lock pin 30 resists the urging forces of the pressure coil spring 32 due to the above-described projecting part 18A of the second cam 18 and slide-shifts to the lock body 20 outer side and, as a result, the starter lock pin 30 projects from the side wall of the lock body 20.

The base end side of a shift lever 34 is supported to have freedom to rotate in the side wall lower part of the lock body 20. The end edge side of the shift lever 34 projects to the driver side from the driver seat instrument panel, and a knob button 36 for the driver to clasp is provided in the end edge of the shift lever 34. In addition, a substantially L-shaped link shift 38 is provided in the extreme end of the shift lever 34, and the link shift 38 is supported to have freedom to move to and fro in the central section of the lock body 20. One edge side of the link shift 38 is connected to the knob button 36 by a cable 40 provided in the shift lever 34.

A substantially fan-shaped detent plate 42 is fixed to the base end side of the shift lever 34 as a lock plate, and when shifting is performed by the to and fro movement of the shift lever 34, the detent plate 42 rotates in accordance with this shifting. An engagement pin 43 is provided in an upper arc section of the detent plate 42, and the engagement pin 43 rotates integrally with the detent plate 42. The detent plate 42 is connected to an automatic speed-change gear device (omitted from the diagram) by a cable (omitted from the diagram) and, as a result, when the shift lever 34 is shifted, the engagement pin 43 rotates integrally with the detent plate 42, and the above-described automatic speed-change gear device (omitted from the diagram) is shifted by way of the above-described cable.

A predetermined detent groove 44 is formed in the arc section of the detent plate 42. Here, in a state in which the above-noted knob button 36 is not push-pressured, the other edge side of the above-noted link shift 38 abuts the detent groove 44 and, as a result, the predetermined shifting of the shift lever 34 (by way of example, the shifting from the "R" shift position.to the "P" shift position) is controlled. On the other hand, in a state in which the knob button 36 is push-pressured, the cable 40 is pulled in the knob button 36 direction whereby the other edge side of the link shift 38 is separated from the detent groove 44 and, as a result, the above-described predetermined shifting of the shift lever 34 (by way of example, the shifting from the "R" shift position to the "P" shift position") is possible.

A first insertion hole 48, correspondent with the above-noted first cam 16 and shift lock pin 26, is formed in the wall surface of the detent plate 42. In a state in which the shift lever 34 is positioned in the "P" shift position, the first insertion hole 48 opposes the shift lock pin 26, and furthermore, in this state, when the ignition key is positioned in the "LOCK" position, the first insertion hole 48 opposes a projection part 16A of the first cam 16. As a result, in a state in which the shift lever 34 is positioned in the "P" shift position, when the ignition key is positioned in the "LOCK" position, the shift lock pin 26 projects from the side wall of the lock body 20 due to the projection part 16A of the first cam 16 as described above, and the shift lock pin 26 is inserted in the first insertion hole 48 (see FIG. 1 and FIG. 4).

On the other hand, unless the shift lever 34 is positioned in the "P" shift position, when an attempt is made to rotate the ignition key from the "ACC" position to the "LOCK" position, slide movement to the lock body 20 outer side (detent plate 42 side) of the shift lock pin 26 due to the projection part 16A of the first cam 16 is prevented by the abutment of the shift lock pin 26 on the wall surface of the detent plate 42 and, for this reason, the shift lock pin 26 engages with the projection part 16A of the first cam 16 to stop the rotation of the first cam 16. As a result, the rotation of the ignition key, by way of the key cylinder 12, from the "ACC" position to the "LOCK" position is prevented.

A second insertion hole 50, correspondent with the above-noted second cam 18 and starter lock pin 30, is formed in the wall surface of the detent plate 42. In a state in which the shift lever 34 is positioned in the "P" shift position, the second insertion hole 50 opposes the starter lock pin 30, and furthermore, in this state, when the ignition key is positioned in the "START" position, the second insertion hole 50 opposes the projection part 18A of the second cam 18. As a result, in a state in which the shift lever 34 is positioned in the "P" shift position, when the ignition key is positioned in the "START" position, the starter lock pin 30 projects from the side wall of the lock body 20 due to the projection part 18A of the second cam 18 as described above, and the starter lock pin 30 is inserted in the second insertion hole 50 (see FIG. 5).

Furthermore, a third insertion hole 52, correspondent with the above-noted second cam 18 and starter lock pin 30, is formed in the wall surface of the detent plate 42. In a state in which the shift lever 34 is positioned in the "N" shift position, the third insertion hole 52 opposes the starter lock pin 30, and furthermore, in this state, when the ignition key is positioned in the "START" position, the third insertion hole 52 opposes the projection part 18A of the second cam 18. As a result, in a state in which the shift lever 34 is positioned in the "N" shift position, when the ignition key is positioned in the "START" position, the starter lock pin 30 projects from the side wall of the lock body 20 due to the projection part 18A of the second cam 18 as described above, and the starter lock pin 30 is inserted in the third insertion hole 52 (see FIG. 5).

On the other hand, unless the shift lever 34 is positioned in the "P" shift position or "N" shift position, when an attempt is made to rotate the ignition key from the "ON" position to the "START" position, slide movement of the starter lock pin 30 to the lock body 20 outer side (detent plate 42 side) due to the projection part 18A of the second cam 18 is prevented by the abutment of the starter lock pin 30 on the wall surface of the detent plate 42 and, as a result, the starter lock pin 30 engages with the projection part 18A of the second cam 18 to stop the rotation of the second cam 18. As a result, the rotation of the ignition key, by way of the key cylinder 12, from the "ON" position to the "START" position is prevented.

A brake cable pin 54 is provided in the arc section region of the detent plate 42. The brake cable pin 54 is correspondent to the detent plate 42 and is connected to a brake (omitted from the diagram) by a cable (omitted from the diagram) The configuration is such that, in a state in which the shift lever 34 is positioned in the "P" shift position, unless the brake is operated, the brake cable pin 54 engages with the arc section edge part of the detent plate 42 to prevent the rotation of the detent plate 42, and when the brake is operated, engagement of the brake cable pin 54 with the arc section edge part of the detent plate 42 is released.

Next, a description of the action of the embodiment will be given.

The shift lever device 10 of the configuration described above comprises a key interlock mechanism, and the shift lock pin 26 supported by a holding hole 22 of the lock body 20 in a state in which it is urged towards the lock body 20 inner side (opposing detent plate 42 side) by a pressure coil spring 28. In addition the shift lock pin 26, in a state in which the shift lever 34 is positioned in the "P" shift position, opposes the first insertion hole 48 of the detent plate 42, and in a state in which the shift lever 34 is not in the "P" shift position, it is offset from the first insertion hole 48 to oppose the wall surface of the detent plate 42.

For this reason, in a state in which the shift lever 34 is positioned in the "P" shift position, when the ignition key (omitted from the diagram) is rotated from the "ACC" position to the "LOCK" position, the shift lock pin 26 is slide-shifted to the lock body 20 outer side (detent plate 42 side) by the projection part 16A of the first cam 16 to project from the lock body 20 side wall, and the shift lock pin 26 is inserted in the first insertion hole 48 of the detent plate 42 (see FIG. 1 and FIG. 4). As a result, the slide movement of the shift lock pin 26 to the detent plate 42 side is not prevented by the wall surface of the detent plate 42, and the ignition key can be rotated from the "ACC" position to the "LOCK" position.

On the other hand, in a state in which the shift lever 34 is not positioned in the "P" shift position, when an attempt is made to rotate the ignition key from the "ACC" position to the "LOCK" position, slide movement of the shift lock pin 26 to the detent plate 42 side due to the projection part 16A of the first cam 16 is prevented by the abutment of the shift lock pin 26 against the wall surface of the detent plate 42. As a result, the shift lock pin 26 engages with the projection part 16A of the first cam 16 to stop the rotation of the first cam 16, and for this reason, the rotation of the ignition key, by way of the key cylinder 12, from the "ACC" position to the "LOCK" position is prevented.

Accordingly, in the use of this key interlock mechanism, unless the shift lever 34 is shifted to the "P" shift position, the ignition key cannot be pulled out from the key cylinder 12.

Furthermore, this shift lever device 10 comprises a shift lock mechanism. As is described above, when the ignition key is rotated from the "ACC" position to the "LOCK" position in a state in which the shift lever 34 is positioned in the "P" shift position, the shift lock pin 26 is slide-shifted to the detent plate 42 side by the projection part 16A of the first cam 16, and the shift lock pin 26 is inserted in the first insertion hole 48 of the detent plate 42 fixed in the shift lever 34. As a result, the rotation of the detent plate 42 is prevented (see FIG. 1 and FIG. 4). Furthermore, in a state in which the shift lever 34 is positioned in the "P" shift position and the brake (omitted from the diagram) is not operated, a brake cable pin 54 provided correspondent to the detent plate 42 engages with the detent plate 42 to prevent the rotation of the detent plate 42. Accordingly, when the shift lever 34 is positioned in the "P" shift position, the shifting of the shift lever 34 from the "P" shift position is prevented by the prevention of the rotation of the detent plate 42.

On the other hand, when the ignition key is rotated to a position other than the "LOCK" position in a state in which the shift lever 34 is positioned in the "P" shift position, the shift lock pin 26 is slide-shifted to the opposing detent plate 42 side by the urging forces of the pressure coil spring 28 in accordance with the rotation of the first cam 16 and, as a result, the shift lock pin 26 is pulled out from the first insertion hole 48 of the detent plate 42. Furthermore, when the brake is operated in this state, the engagement of the brake cable pin 54 with the detent plate 42 is released. As a result, rotation of the detent plate 42 is possible, and the shifting of the shift lever 34 from the "P" shift position is possible.

Accordingly, in the use of the shift lock mechanism, unless the brake is operated in a state in which the ignition key is rotated to a position other than the "LOCK" position, the shift lever 34 cannot be shifted from the "P" shift position.

In addition, this shift lever device 10 comprises a key starter lock mechanism, and a starter lock pin 30 supported in the holding hole 24 of, the lock body 20 forms a state in which it is urged to the opposing detent plate 42 side by the urging forces of a pressure coil spring 32. In addition, the starter lock pin 30, in a state in which the shift lever 34 is positioned in the "P" shift position, opposes the second insertion hole 50 of the detent plate 42 in a state in which the shift lever 34 is positioned in the "N" shift position, it opposes the third insertion hole 52 of the detent plate 42. On the other hand, the starter lock pin 30, in a state in which the shift lever 34 is not positioned in the "P" shift position or the "N" shift position, is offset from the second insertion hole 50 and the third insertion hole 52 to oppose the wall surface of the detent plate 42.

For this reason, when the ignition key is rotated from the "ON" position to the "START" position in a state in which the shift lever 34 is positioned in the "P" shift position, the starter lock pin 30 is slide-shifted by the projection part 18A of the second dam 18 to the detent plate 42 side to project from the lock body 20 side wall, and the starter lock pin 30 is inserted into the second insertion hole 50 of the detent plate 42 (see FIG. 5). Furthermore, in a state in which the shift lever 34 is positioned in the "N" shift position, when the ignition key is rotated from the "ON" position to the "START" position, the starter lock pin 30 is slide-shifted by the projection part 18A of the second cam 18 to the detent plate 42 side to project from the lock body 20 side wall, and the starter lock pin 30 is inserted into the third insertion hole 52 of the detent plate 42 (see FIG. 5). As a result, in the state in which the shift lever is positioned in the "P" shift position or the "N" shift position, the slide movement of the starter lock pin 30 to the detent plate 42 side is not prevented by the wall surface of the detent plate 42, and the ignition key can be rotated from the "ON" position to the "START" position.

On the other hand, when an attempt is made to rotate the ignition key from the "ON" position to the "START" position in a state in which the shift lever 34 is not positioned in the "P" shift position or the "N" shift position, slide movement of the starter lock pin 30 to the detent plate 42 side due to the projection part 18A of the second cam 18 is prevented by the abutment of the starter lock pin 30 against the wall surface of the detent plate 42. As a result, the starter lock pin 30 engages with the projection part 18A of the second cam 18 to stop the rotation of the second cam 18, and for this reason, the rotation of the ignition key, by way of the key cylinder 12, from the "ON" position to the "START" position is prevented.

Accordingly, in the use of the starter lock mechanism, unless the shift lever 34 is positioned in the "P" shift position or "N" shift position, the ignition key cannot be rotated from the "ON" position to the "START" position, and the engine cannot be started.

Here, in the use of the shift lever device 10 according to the embodiment, the shift lever 34 is supported by a lock body 20 which houses the key cylinder 12, and a first cam 16 and a second cam 18 are provided in the key cylinder 12. In addition, a first insertion hole 48 correspondent with the first cam 16 is provided in the wall surface of the detent plate 42 fixed in the shift lever 34, and a shift lock pin 26 correspondent to the detent plate 42 and the first cam 16 is held by the lock body 20. Furthermore, a second insertion hole 50 and third insertion hole 52 correspondent with the second cam 18 are provided in the wall surface of the detent plate 42 fixed in the shift lever 34, and a starter lock pin 30 correspondent to the detent plate 42 and the second cam 18 is supported by the lock body 20. As a result, the shift lever device 10 forms an integrated component 14 (integral unit) with the key cylinder 12 (lock body 20) and, for this reason, there is no need;for the provision of space for each of the shift lever device 10 and key cylinder 12 (lock body 20), and a reduction in the space used can be achieved. Furthermore, for this reason, connection components between the shift lever device 10 and key cylinder 12 (lock body 20) in the key interlock mechanism, shift lock mechanism and starter lock mechanism such as cables, solenoids and electrical cord are unnecessary, and a simplification, reduction in costs and weight-lightening can be achieved.

In addition, in the use of the key interlock mechanism and shift lock mechanism, when the ignition key is pulled out from the key cylinder 12 for parking the vehicle, based on the key interlock mechanism, the shift lever 34 is positioned in the "P" shift position. Accordingly, when the vehicle is parked, the shift lever 34 is positioned in the "P" shift position, and in this state, based on the shift lock mechanism, unless the ignition key is rotated to a position other than the "LOCK" position, the shift lever 34 cannot be shifted from the "P" shift position and the brake is operated. That is to say, in the state in which the vehicle is parked, the shift lever 34 cannot be shifted from the "P" shift position without an ignition key and, as a result, the key interlock mechanism and shift lock mechanism are able to function as an anti-theft device.

Accordingly, in the shift lever device 10 pertaining to the embodiment, by virtue of the fact that the key cylinder 12 (lock body 20) is integrated to form an integrated component 14, the key interlock mechanism and shift lock mechanism are able to function as an anti-theft device and, as a result, the conventional steering lock mechanism can be dispensed with and a simplification, weight-lightening and reduction of costs of the steering column, to which is fixed the steering wheel, and the steering post, which houses this steering column, can be achieved. In addition, the conventional lock bar and the like of the lock body 20 can be dispensed with and, as a result, compacting, weight-lightening and cost reduction of the lock body 20 can be achieved. Furthermore, because there is no need for a conventional lock body lock bar to be caused to engage with the steering column (no need for the lock body 20 to be fitted in the steering post), there is no need for the deployment of the lock body 20 in the vicinity of the steering post, and an increase in the degree of freedom of the mounting position in the vehicle of the lock body can be achieved.

Furthermore, because the detent plate 42 side edge part of the shift lock pin 26 is an substantially semicircular shape, by way of example, the breakage of the shift lock pin 26 by a drill or the like can be made difficult, and the function of the key interlock mechanism and shift lock mechanism as an anti-theft device can be improved.

In addition, because the shift lock pin 26 has a cross-section of a substantially circular shape (cylinder shape), by way of example, the breakage of the shift lock pin 26 by a drill or the like can be made more difficult, and the function of the key interlock mechanism and shift lock mechanism as an anti-theft device can be further improved.

Furthermore, by virtue of the fact that the shift lever device 10 is integrated with the key cylinder 12 (lock body 20) to form an integrated component 14, the rotation of the ignition key in the starter lock mechanism from the "ON" position to the "START" position" can be mechanically prevented, and for this reason, the conventional electrical system can be dispensed with and a simplification and reduction in costs of the starter lock mechanism can be achieved.

FIRST VARIANT EXAMPLE

Figure 6:
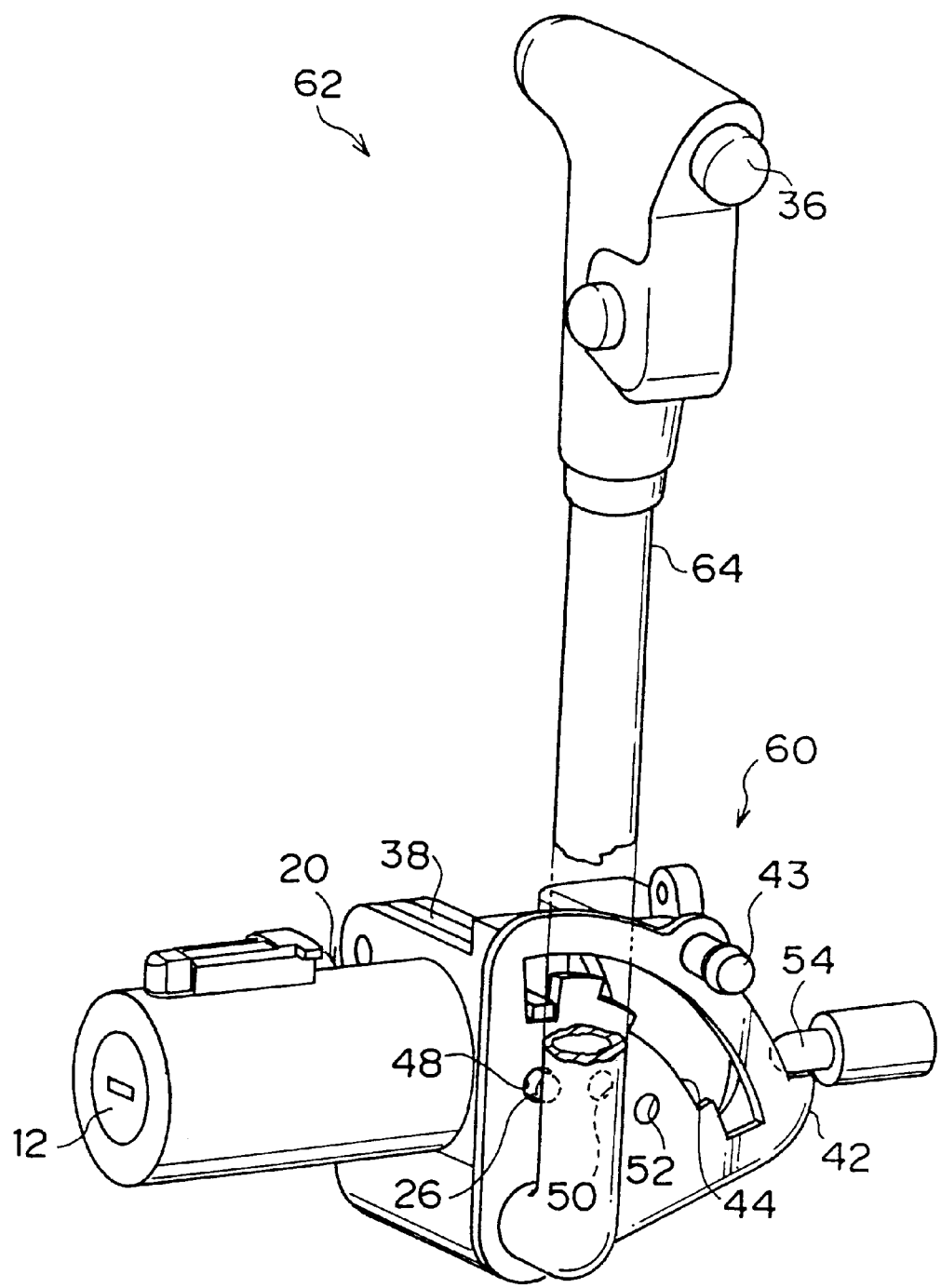
FIG. 6 is a perspective view which shows the integrated component of the integrated shift lever device and key cylinder pertaining to a first variant example of the first embodiment of the present invention.
Figure 7:
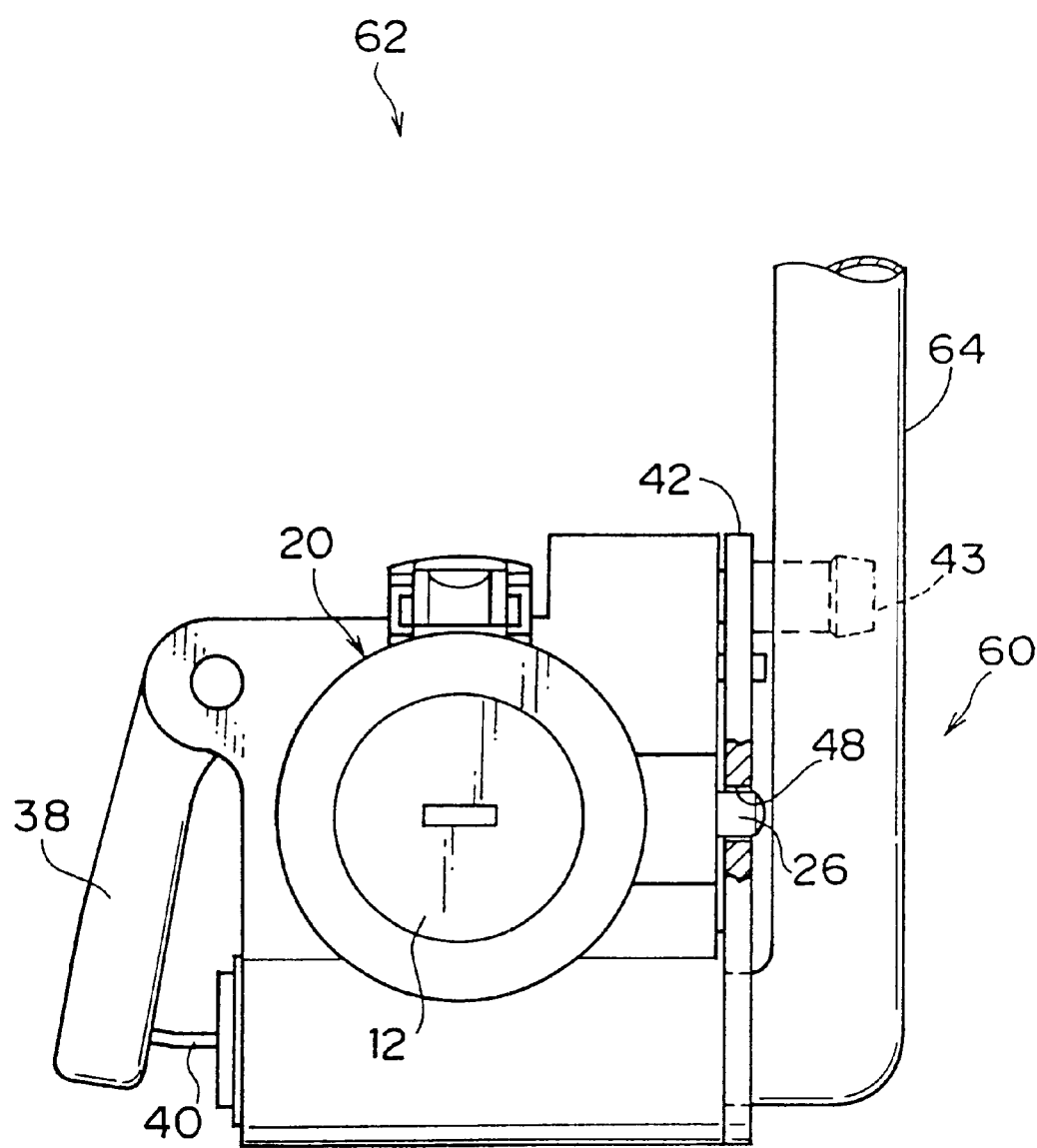
FIG. 7 is a front surface view which shows the integrated component of the integrated shift lever device and key cylinder pertaining to a first variant example of the first embodiment of the present invention.
Figure 8:
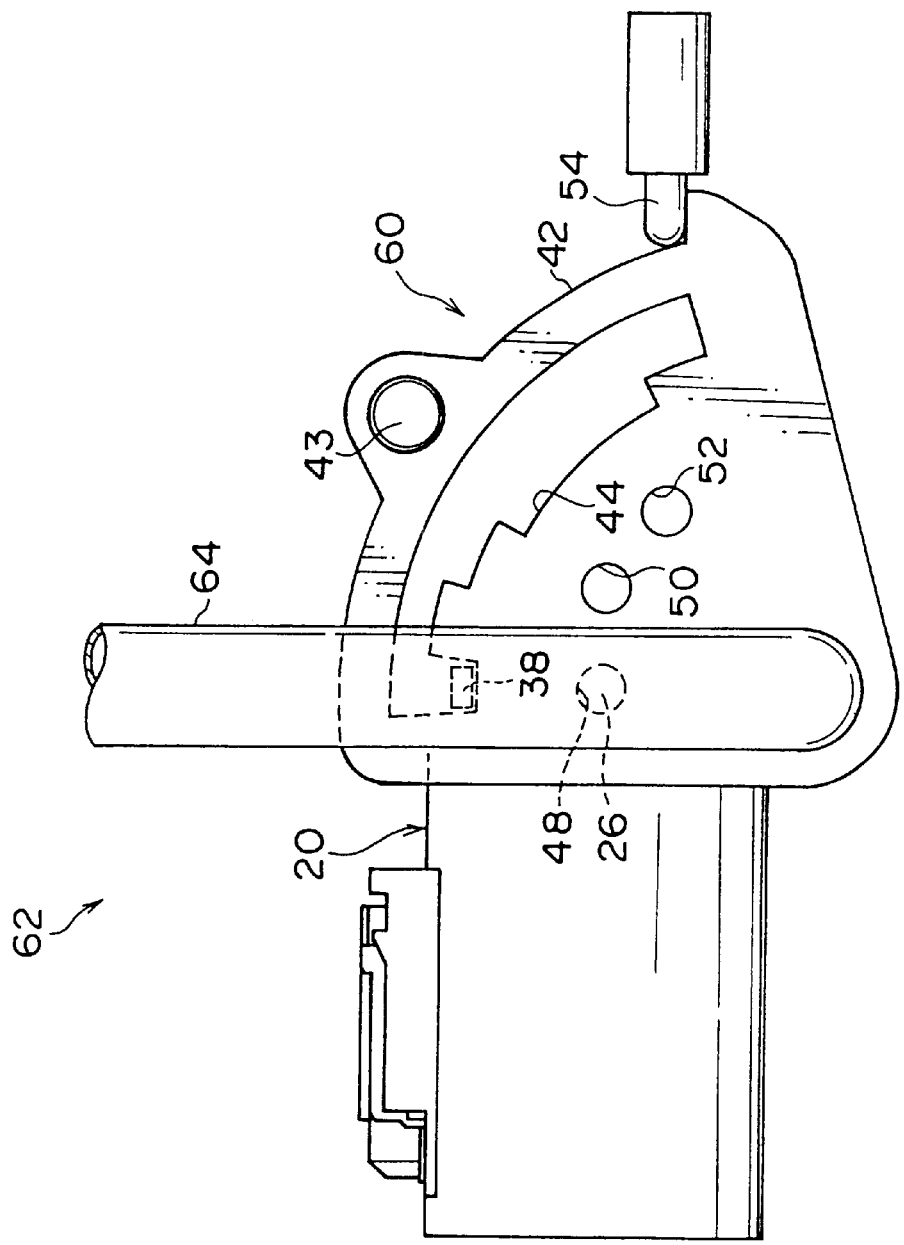
FIG. 8 is a side surface view which shows the integrated component of the integrated shift lever device and key cylinder pertaining to a first variant example of the first embodiment of the present invention.

FIG. 6 shows a perspective view of an integrated component 62 configured by the integration of the shift lever device 60 and the key cylinder 12 pertaining to a first variant example of the first embodiment, and FIG. 7 is a front surface view of the integrated component 62. FIG. 8 shows a side surface view of the integrated component 62.

In the shift lever device 60 pertaining to the present variant example, the shift lever 64 has a role as shielding device. That is to say, the shift lever 64 opposes the first insertion hole 48 and the shift lever 64 and first insertion hole 48 draw close to each other and, as a result, in a case in which the shift lever 64 is positioned in the "P" shift position, the shift lock pin 26 is shielded by the shift lever 64. It will be noted that the other configurations are the same as those of the above-described first embodiment.

In the use of the shift lever device 60 pertaining to the present variant example, the same action and effect as those of the above-described embodiment can be produced.

Furthermore, in the use of the shift lever device 60 pertaining to the present variant example, in a state in which the shift lever 64 is positioned in the "P" shift position (in the state when the vehicle is parked), because the shift lock pin 26 is shielded by the shift lever 64, breakage of the shift lock pin 26 from the exterior can be made difficult. As a result, the function of the key interlock mechanism and the shift lock mechanism as an anti-theft device can be further improved. In addition, because the shift lever 64 performs a role as shielding device, there is no need for the special addition of a shielding member to shield the shift lock pin 26, and the shift lock pin 26 can be shielded easily.

SECOND VARIANT EXAMPLE

Figure 9:
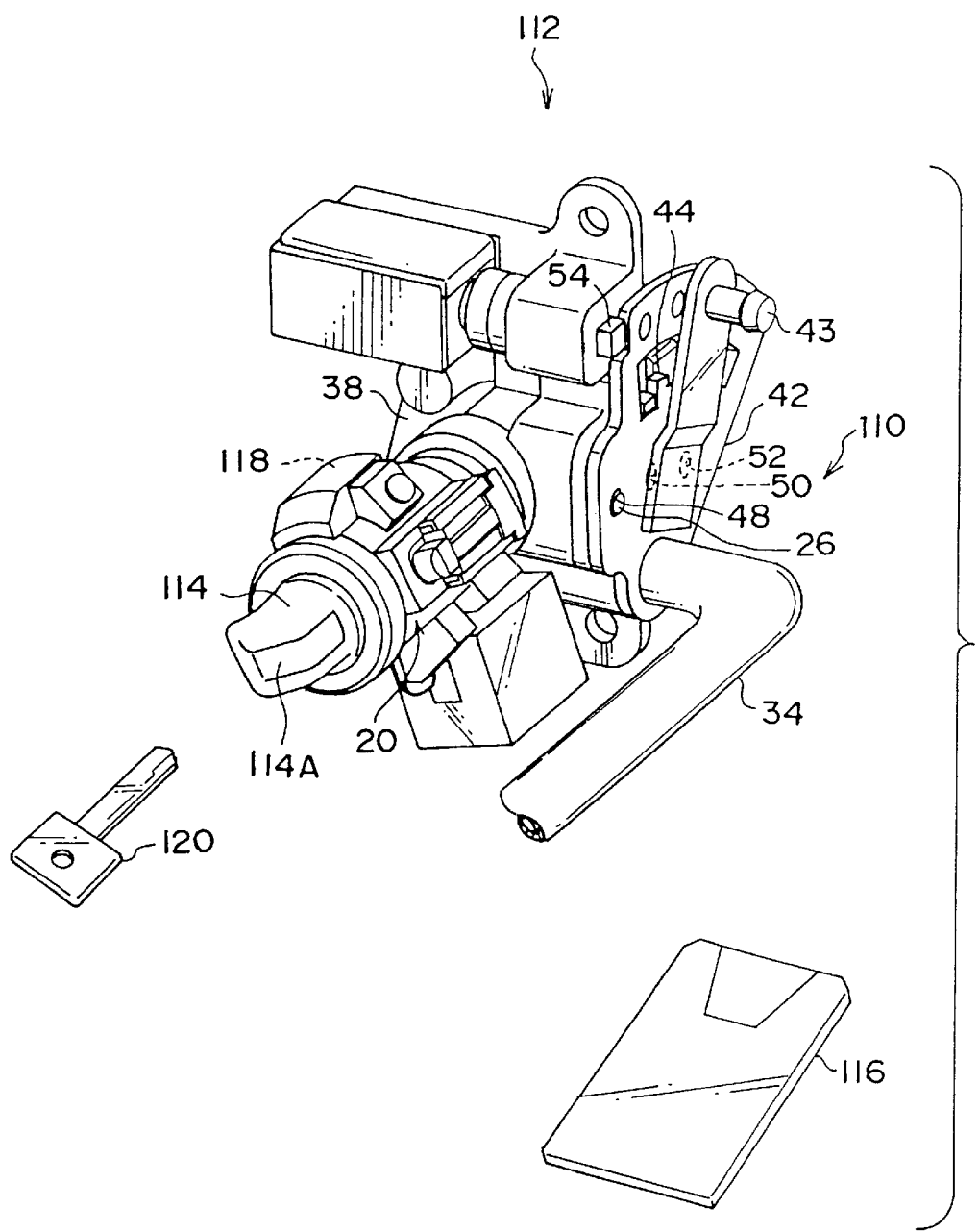
FIG. 9 is a perspective view which shows the integrated component and so on of the integrated shift lever device and key cylinder pertaining to a second variant example of the first embodiment of the present invention.

FIG. 9 shows a perspective view of an integrated component 112 configured by the integration of a shift lever device 110 and a key cylinder 12 pertaining to a second variant example of the first embodiment.

In the shift lever device 110 pertaining to the present variant example, a configuration is adopted in which a starter clasp part 114, which constitutes an operation part, is provided in the side wall on the driver seat side of the lock body 20 wherein, by virtue of the fact that the starter clasp part 114 is clasped in order to effect rotation, the starter clasp part 114 is integrally rotated with the key cylinder 12 of the lock body 20. On the other hand, an electronic card key 116 (transmitter) is mounted in the vehicle and an electronic card key 116 transmits a predetermined ID code (predetermined information). In addition, a receiver (omitted from the diagram) which opposes the electronic card key 116 is provided in the vehicle, and by virtue of the fact that the electronic card key 116 is deployed in the vehicle, the receiver receives the predetermined ID code transmitted by the electronic card key 116. Here, the electronic card key 116 is deployed in the vehicle whereby the receiver receives a predetermined ID code from the electronic card key 116 and, when the starter clasp part 114 is rotated in a state in which the shift lever 34 is in the "P" shift position or the "N" shift position, the engine (omitted from the diagram) is started.

Furthermore, as well as an immobilizer coil 118, which constitutes an operation part, provided in the lock body 20, an immobilizer key 120 is provided in the vehicle as the ignition key, wherein the immobilizer key 120 is able to be inserted in the key cylinder 12 through an insert hole 114A provided in the starter clasp part 114. A transponder (omitted from the diagram) is enclosed within the immobilizer key 120, and a predetermined ID code (specific information) is recorded in the transponder, and by virtue of the fact that the immobilizer key 120 is inserted in the key cylinder 12 through the insert hole 114A, the specific ID code of the transponder enclosed within the immobilizer key 120 is read by the immobilizer coil 118. It will be noted that a battery is not necessary for the specific ID code transmission from the transponder. In other words, by the electromagnetic dielectric action between the transponder and the immobilizer coil 118, power is supplied from the immobilizer coil 118 connected to the vehicle side power source to the transponder without contact. Here, the configuration adopted is such that the immobilizer coil 118 reads the specific ID code of the immobilizer key 120 in this way and, when the immobilizer key 120 is rotated in a state in which the shift lever 34 is positioned in the "P" shift position or the "N" shift position, the engine is started. It will be noted that the other configurations are the same as those of the above-described first embodiment.

In the use of the shift lever device 110 pertaining to the present variant example, the same action and effect as those of the above-described first embodiment can be produced.

It will be noted that the above-noted second variant example is a configuration in which an immobilizer key 120, in which is enclosed a transponder in which specific IC code (specific information) is recorded, is provided in the vehicle, but a configuration in which a function the same as the above-described transponder is imparted to the electronic card key 116 and the specific ID code (specific information) is recorded in this electronic card key 116, or a configuration in which the above-described transponder is housed in the electronic card key 116 may be adopted. In a configuration such as this, by way of example, even when a breakdown or battery disconnection of the electronic card key 116 (when the predetermined IC code is not transmitted by the electronic card key 116) occurs, the electronic card key 116 is close to the immobilizer coil 118 whereby the specific IC code of the electronic card key 116 is read by the immobilizer coil 118 and, when the starter clasp part 114 is rotated in a state in which the shift lever 34 is in the "P" shift position or "N" shift position, the engine is started. For this reason, the provision in the vehicle of an immobilizer key 120 in addition to an electronic card key 116 can be made unnecessary.

Second Embodiment

Figure 10:
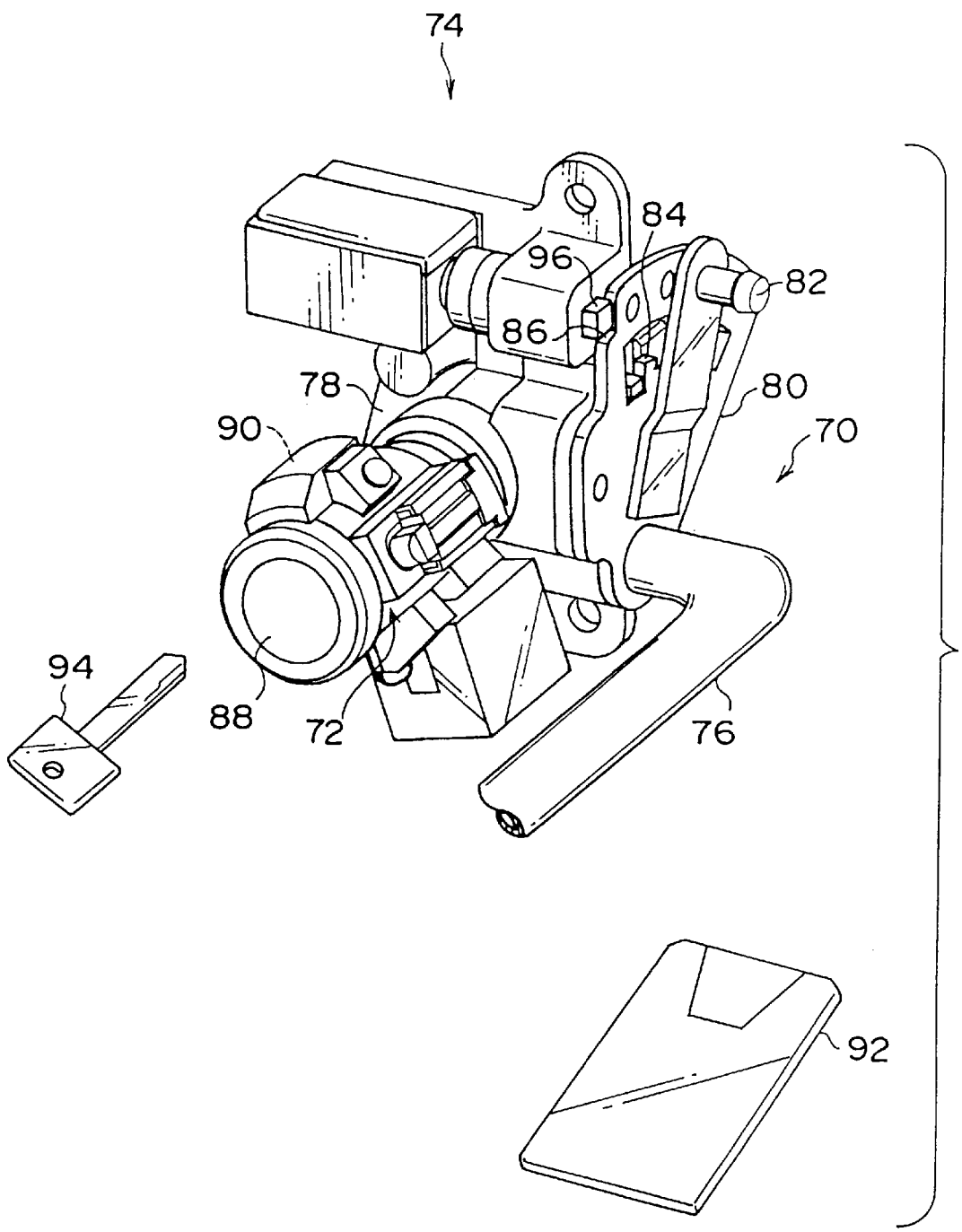
FIG. 10 is a perspective view which shows the integrated component and so on of the integrated shift lever device and key cylinder pertaining to a second embodiment of the present invention.

FIG. 10 shows a perspective view of an integrated component 74 configured from the integration of the shift lever device 70 and lock body 72 pertaining to a second embodiment.

The shift lever device 70 pertaining to the embodiment is a so-called column type shift lever device, and the integrated component 74 is configured by the integration with an substantially cylinder shaped lock body 72 which constitutes an operation part. In addition, the lock body 72 is deployed in the driver seat instrument panel (omitted from the diagram).

The base end side of a shift lever 76 is supported to have freedom to rotate in the side wall lower part of the lock body 72. The end edge side of the shift lever 76 projects to the driver side from the driver seat instrument panel, and a knob button (omitted from the diagram) for the driver to clasp is provided in the end edge of the shift lever 76. In addition, an substantially L-shaped link shift 78 is provided in the extreme end of the shift lever 76, and the link shift 78 is supported so as to have freedom to move to and fro in the central section of the lock body 72. One edge side of the link shift 78 is connected to the knob button by a cable (omitted from the diagram) provided in the shift lever 76.

A substantially fan-shaped detent plate 80 is fixed to the base end side of the shift lever 76 as a lock plate, and when the shift lever 76 is shifted by the to and fro movement, the detent plate 80 rotates in accordance with the shifting. An engagement pin 82 is fixed in the detent plate 80 and the engagement pin 82 rotates integrally with the detent plate 80. The engagement pin 82 is connected to an automatic speed-change gear device (omitted from the diagram) by a shift levering cable (omitted from the diagram) and, as a result, when the shift lever 76 is shifted, the engagement pin 82 rotates integrally with the detent plate 80, and the above-described automatic speed-change gear device (omitted from the diagram) is shifted by way of the above-described shift levering cable.

A predetermined detent groove 84 is formed in the vicinity of the arc section of the detent plate 80. Here, in the state in which the above-noted knob button is not push-pressured, the other edge side of the above-noted link shift 78 abuts the detent groove 84 and, as a result, the predetermined shifting of the shift lever 76 (by way of example, the shifting from the "R" shift position to the "P" shift position) is controlled. On the other hand, in a state in which the knob button is push-pressured, the above-described cable is pulled in the direction of the knob button whereby the other edge side of the link shift 78 is separated from the detent groove 84 and, as a result, the above-described predetermined shifting of the shift lever 76 (by way of example, the shifting from the "R" shift position to the "P" shift position) is possible.

The arc section edge part of the detent plate 80 is notched into an L-shape and, as a result, an engagement notch 86 is formed in the arc section edge part of the detent plate 80. The engagement notch 86 is correspondent with a later-described shift lock pin 96.

A start button 88, which constitutes an operation part, is provided as a starter part in the side wall on the driver seat side of the lock body 72, and the start button 88 is connected to a starter (omitted from the diagram) which affords the starting of the engine (omitted from the diagram) on the other hand, an electronic card key 92 is mounted in the vehicle as a transmitter and the electronic card key 92 receives power from a battery to transmit the predetermined ID code (predetermined information). In addition, a receiver (omitted from the diagram) which opposes the electronic card key 92 is provided in the vehicle, and by virtue of the fact that the electronic card key 92 is deployed in the vehicle, the receiver receives the predetermined ID code transmitted by the electronic card key 92. Furthermore, the receiver is connected to the above-described starter by way of a control device (so-called ECU, omitted from the diagram). Here, the electronic card key 92 is deployed in the vehicle whereby the receiver receives the predetermined ID code from the electronic card key 92 and, when the start button 88 is push-pressured in a state in which the shift lever 76 is in the "P" shift position, the engine (omitted from the diagram) is started.

Furthermore, an immobilizer coil 90, which constitutes an operation part, is provided in the lock body 72, and the immobilizer coil 90 is connected to the above-described starter by way of the above-described control device. A key cylinder (omitted from the diagram), which constitutes an operation part, is housed in the inner part of the lock body 72, and the key cylinder is connected to the above-described starter. On the other hand, an immobilizer key 94 is provided in the vehicle and, by the detachment of the start button 88, the immobilizer key 94 can be inserted in the key cylinder. A transponder (omitted from the diagram) is enclosed in the immobilizer key 94 and a specific ID code (specific information) is recorded in the transponder and, by virtue of the fact that the start button 88 is detached whereby the immobilizer key 94 is inserted in the key cylinder, the specific ID code of the transponder enclosed in the immobilizer key 94 is read by the immobilizer coil 90. It will be noted that a battery is not necessary for the specific ID code transmission from the transponder. In other words, by the electromagnetic dielectric action between the transponder and the immobilizer coil 90, power is supplied from the immobilizer coil 90 connected to the vehicle side power source to the transponder without contact. Here, a configuration is adopted in which the immobilizer coil 90 reads the specific ID code of the immobilizer key 94 in this way and, when the immobilizer key 94 is rotated in a state in which the shift lever 76 is positioned in the "P" shift position, the engine is started.

A substantially rectangular-shaped shift lock pin 96 correspondent with the engagement pin 86 of the above-described detent plate 80 is provided in the upper part of the lock body 72, and the shift lock pin 96 is connected to a brake (omitted from the diagram) for braking the vehicle. By virtue of the fact that there is an electrical action on the shift lock pin 96 whereby it slides to the detent plate 80 side, engagement with the engagement pin 86 of the detent plate 80 is possible. Here, unless the brake is operated in a state in which the engine is started as described above, the shift lock pin 96 slides to the detent plate 80 side to engage with the engagement pin 86 and, as a result, rotation of the detent plate 80 is prevented.

Next, a description of the action of the present embodiment will be given.

In the shift lever device 70 of the above configuration, by virtue of the fact that an electronic card key 92 is deployed in the vehicle, the receiver (omitted from the diagram) receives the predetermined ID code transmitted by the electronic card key 92. Here, the receiver receives the predetermined information from the electronic key card 92 in this way, and, when the start button 88 is push-pressured in a state in which the shift lever 76 is in the "P" shift position, the engine (omitted from the diagram) is started.

Furthermore, by virtue of the fact that the start button 88 is detached from the lock body 72 whereby the immobilizer key 94 is inserted in the key cylinder (omitted from the diagram), the specific information recorded on the transponder enclosed in the immobilizer key 94 is read by the immobilizer coil 90. Here, the immobilizer coil 90 reads the specific ID code of the immobilizer key 94 in this way and, when the immobilizer key 94 is rotated in a state in which the shift lever 76 is positioned in the "P" shift position, the engine is started.

In addition this shift lever device 70 comprises a shift lock mechanism. Unless the brake (omitted from the diagram) is operated in a state in which the engine is started as described above, the shift lock pin 96 engages with the engagement notch 86 of the detent plate 80 to prevent the rotation of the detent plate 80. For this reason, the shifting of the shift lever 76 from the "P" shift position is prevented.

On the other hand, when the brake is operated in a state in which the engine is started as described above, the engagement of the shift lock pin 96 with the detent plate 80 (engagement notch 86) is released, and rotation of the detent plate 80 is permitted. For this reason, the shifting of the shift lever 76 from the "P" shift position is possible.

Accordingly, in the use of the shift lock mechanism, unless the brake is operated in a state in which the engine is started, the shift lever 76 cannot be shifted from the "P" shift position.

Here, in the use of the shift lever device 70 pertaining to the present embodiment, a shift lever 76 is supported by a lock body 72 which houses a key cylinder, and a shift lock pin 96 correspondent with the detent plate 80 fixed in the shift lever 76 is provided in the lock body 72. As a result, the shift lever device 70 forms an integrated component 74 (integral unit) with the lock body 72 (key cylinder) and, for this reason, there is no need for the provision of space for each of the shift lever device 70 and lock body 72 (key cylinder), and a reduction in the space used can be achieved.

Furthermore, for this reason, connection components between the shift lever device 70 and lock body 72 (key cylinder) in the shift lock mechanism such as cables, solenoids and electrical cord are unnecessary, and a simplification, reduction in costs and weight-lightening can be achieved. In addition, in this shift lever device 70, the shift lever 76 is normally positioned in the "P" shift position when the vehicle is parked, and in this state, based on the shift lock mechanism, unless the brake is operated in a state in which the engine is started, the shift lever 76 cannot be shifted from the "P" shift position. That is to say, in the state in which the vehicle is parked, unless the engine is started by the electronic card key 92 or immobilizer key 94, the shift lever 76 cannot be shifted from the "P" shift position and, as a result, the shift lock mechanism is able to function as an anti-theft device.

Accordingly, in the shift lever device 70 pertaining to the present embodiment, by virtue of the fact that the lock body 72 (key cylinder) is integrated, the shift lock mechanism is able to function as an anti-theft device and, as a result, the conventional steering lock mechanism can be dispensed with whereby a simplification, weight-lightening and reduction of costs of the steering column, to which is fixed the steering wheel, and the steering post, which houses this steering column, can be achieved. In addition, the conventional lock bar and the like of the lock body can be dispensed with and as a result, compacting, weight-lightening and cost reduction of the lock body can be achieved. Furthermore, because there is no need for a conventional lock body lock bar to be caused to engage with the steering column (no need for the lock body to be fitted in the steering post), there is no need for the deployment of the lock body 72 in the vicinity of the steering post, and an increase in the degree of freedom of the mounting position in the vehicle of the lock body 72 can be achieved. Furthermore, because a configuration can be formed in which it is not always necessary that the push-pressure operation of the start button 88 be performed with the right hand (can easily be performed with the left hand), there is no need for the lock body 72 to be mounted in a position in which the operation of the start button 88 is performed by the right hand and, as a result, the operability of the start button 88 is better maintained and an increase in the degree of freedom of the mounting position in the vehicle of the lock body 72 can be achieved.

In addition, as described above, the immobilizer key 94 is inserted in the key cylinder whereby the specific ID code of the immobilizer key 94 is read by the immobilizer coil 90, and when the immobilizer key 94 is rotated in a state in which the shift lever 76 is positioned in the "P" shift position, the engine is started. As a result, byway of example, even when a battery disconnection to or breakdown of the electronic card key 92 occurs (when the prescribed ID code is not transmitted from the electronic card key 92) the engine can be started by the immobilizer key 94.

It will be noted that, in the above-described second embodiment, a configuration may be adopted in which the engine cannot be stopped unless the shift lever 76 is in the "P" shift position, and as a result, when the vehicle is parked, the shift lever 76 is always in the "P" shift position. Accordingly, the shift lock mechanism can function reliably as an anti-theft device.

Figure 11:
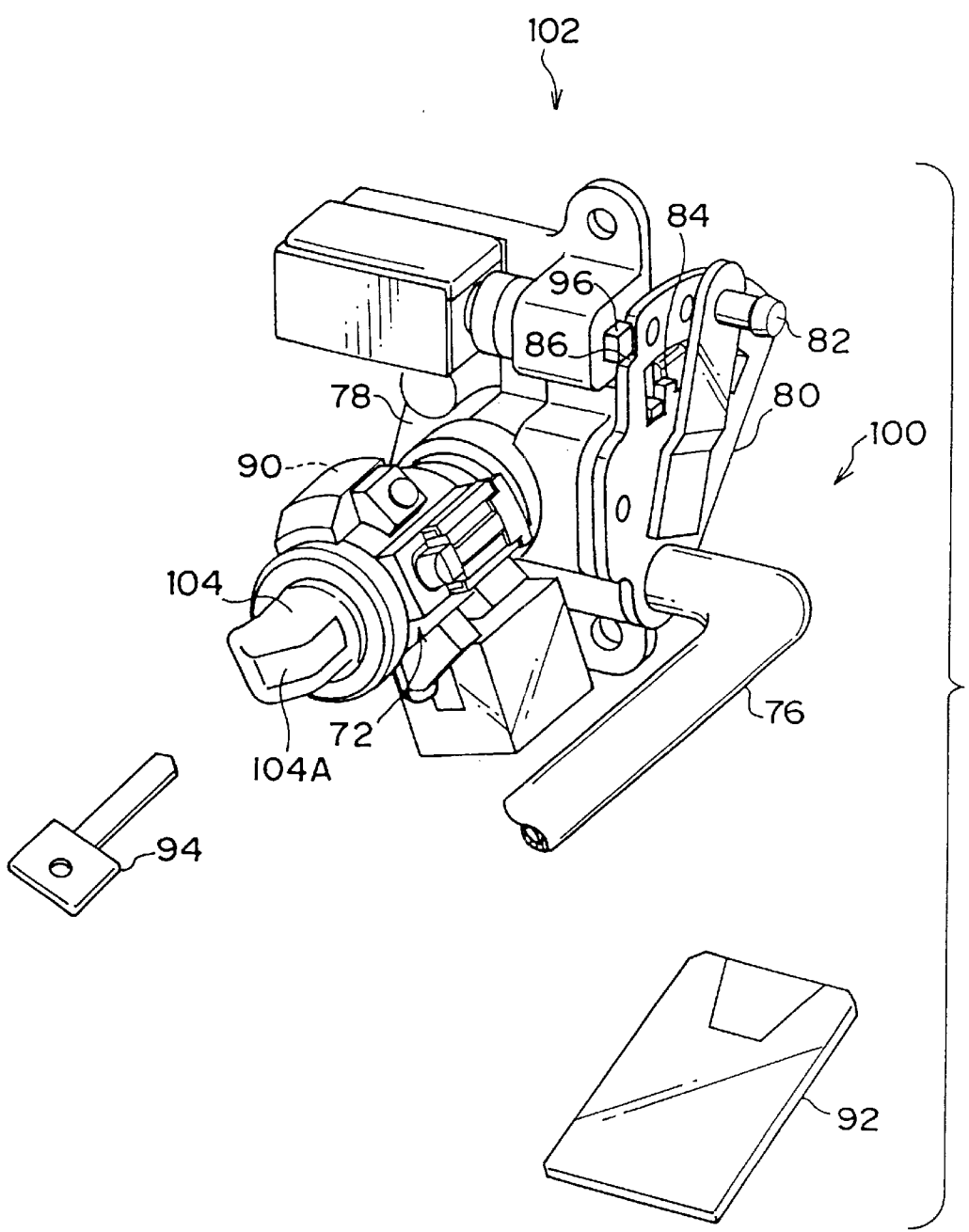
FIG. 11 is a perspective view that shows a separate example of the integrated component of the integrated shift lever device and key cylinder pertaining to the second embodiment of the present invention.

In addition, in the above-described second embodiment, the configuration is one in which the start button 88 is provided in the lock body 72, but, by way of example, as for the shift lever device 100 (integrated component 102) shown in FIG. 11, a configuration may be adopted in which, instead of a start button 88, a start clasp part 104 is provided in the lock body 72 as a start member which constitutes an operation part. That is to say, in the shift lever device 100, a configuration is adopted in which, by virtue of the fact that the start clasp part 104 is clasped to effect rotation, the start clasp part 104 rotates integrally with the key cylinder in the lock body 72, an electronic card key 92 is deployed in the vehicle whereby the predetermined ID code which is transmitted by the electronic card key 92 is received by the receiver in the same way as described above and, when the start clasp part 104 is rotated to cause the key cylinder to rotate integrally in a state in which the shift lever 76 is positioned in the "P" shift position, the key cylinder rotates integrally whereby the engine (omitted from the diagram) is started. Furthermore, the immobilizer key 94 is able to be inserted in the key cylinder through an insert hole 104A provided in the start clasp part 104, and the immobilizer key 94 is inserted in the key cylinder by way of the insert hole 104A whereby the immobilizer coil 90 reads the specific information recorded on the immobilizer key 94 and, when the immobilizer key 94 is rotated to cause the key cylinder to rotate integrally in a state in which the shift lever 76 is in the "P" shift position, the engine is started.

It will be noted that the above-described second embodiment (including the separate example shown in FIG. 11) is a configuration in which an immobilizer key 94, in which is enclosed a transponder on which specific ID code (specific information) is recorded, is mounted in the vehicle, but a configuration in which a function the same as the above-described transponder is imparted to an electronic card key 92 and the specific ID code (specific information) is recorded on the electronic card key 92, or a configuration in which the above-described transponder is housed in the electronic card key 92 may be adopted. In a configuration such as this, by way of example, even when a breakdown or battery disconnection of the electronic card key 92 (when the predetermined ID code is not transmitted by the electronic card key 92) occurs, the electronic card key 92 is drawn near to the immobilizer coil 90 whereby the specific ID code of the electronic card key. 92 is read by the immobilizer coil 90 and, when the start button 88 is push-pressured (in the separate example when the start clasp part 104 is rotated) in a state in which the shift lever 76 is in the "P" shift position, the engine is started. For this reason, the mounting in the vehicle of an immobilizer key 94 in addition to an electronic card key 92 can be made unnecessary.

Furthermore, in the above-described second embodiment, similar to the variant example of the above-described first embodiment (see FIG. 6 to FIG. 8), the shift lever 76 has a role as shielding device. That is to say, the configuration may be such that the shift lever 76 opposes the engagement notch 86 of the detent plate 80, and the shift lever 76 and engagement notch 86 are drawn near to each other and, as a result, in a state in which the shift lever 76 is positioned in the "P" shift position (a state in which the vehicle is parked), the shift lock pin 96 is obstructed by the shift lever 76. By virtue of the fact that a configuration such as this is adopted, breakage of the shift lock pin 96 from the exterior can be made difficult and, as a result, the function of the shift lock mechanism as an anti-theft device can be improved. In addition, because the shift lever 76 performs a role as a shielding device, there is no need for the special addition of a shielding member to obstruct the shift lock pin 26, and the shift lock pin 96 can be shielded easily.

In addition, in the above-described second embodiment, a configuration is adopted in which the shift lock pin 96 is a substantially rectangular-shape, but a configuration may be adopted in which the detent plate side edge part of the shift lock pin is a substantially semicircular shape and the shift lock pin is formed in a substantially circular cross-section shape (substantially cylinder shape). In a configuration such as this, because the detent plate side edge part of the shift lock pin is a substantially semicircular shape, the breakage of the shift lock pin by, for example, a drill, can be made difficult, and the function of the shift lock mechanism as an anti-theft device can be further improved. Furthermore, because the shift lock pin is formed with a substantially circular cross-section shape, the breakage of the shift lock pin by, for example, a drill, can be made difficult, and the function of the shift lock mechanism as an anti-theft device can be even further improved.

Furthermore, in the above described first embodiment (including the first variant example and second variant example) and second embodiment (including the separate example shown in FIG. 11), the shift lever device 10, 60, 70, 100, 110 constitutes a column type shift lever device and is deployed in the driver's seat instrument panel (omitted from the diagram), but without limitation to this, a shift lever device the same as those of first embodiment and second embodiment, may be configured by integration with the key cylinder, and the integrated component which comprises the shift lever device and key cylinder may be deployed in the floor part or the like of the vehicle.

What is claimed is:

1. A shift lever device which comprises:

a key cylinder in which, by the rotation thereof, an engine is started, said key cylinder having an extendible and retractable locking pin and a cam surface;

and a shift lever provided as an integral unit with said key cylinder that, by the pivoting of said lever, performs the shifting in a speed-change gear device, said shift lever having a detent plate for retaining said lever into one of a plurality of gear shift positions;

wherein when said key cylinder is rotated into a lock position the key cylinder cam surface cooperates with the key cylinder locking pin to cause the key cylinder locking pin to extend into a complementary-shaped hole in said detent plate to prevent said lever from pivoting.

* * * * *